(12) United States Patent
Rico Alvarino et al.

(10) Patent No.: US 11,546,120 B2
(45) Date of Patent: Jan. 3, 2023

(54) TECHNIQUES AND APPARATUSES FOR CHANNEL STATE INFORMATION FEEDBACK PERFORMANCE FOR INTRODUCTION OF 64-QAM IN MACHINE TYPE COMMUNICATION DEVICES

(71) Applicant: QUALCOMM Incorporated, San Diego, CA (US)

(72) Inventors: Alberto Rico Alvarino, San Diego, CA (US); Kapil Bhattad, Bangalore (IN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/248,013

(22) Filed: Jan. 5, 2021

(65) Prior Publication Data

US 2021/0126758 A1 Apr. 29, 2021

Related U.S. Application Data

(62) Division of application No. 15/962,682, filed on Apr. 25, 2018, now Pat. No. 10,938,537.

(30) Foreign Application Priority Data

May 5, 2017 (IN) .............................. 201741015896
Jun. 28, 2017 (IN) .............................. 201741022578

(51) Int. Cl.
*H04L 5/00* (2006.01)
*H04L 27/34* (2006.01)
(Continued)

(52) U.S. Cl.
CPC .......... *H04L 5/0057* (2013.01); *H04L 1/0003* (2013.01); *H04L 1/0016* (2013.01); (Continued)

(58) Field of Classification Search
None
See application file for complete search history.

(56) References Cited

U.S. PATENT DOCUMENTS 9,407,417 B2    8/2016  Chen et al.
10,374,847 B2 *  8/2019  Chen .................... H04W 74/006
(Continued)

FOREIGN PATENT DOCUMENTS

CN    105340316 A    2/2016
CN    105850066 A    8/2016
(Continued)

OTHER PUBLICATIONS

Taiwan Search Report—TW107114214—TIPO—dated Jul. 2, 2021.
(Continued)

*Primary Examiner* — Christine T Duong
(74) *Attorney, Agent, or Firm* — Harrity & Harrity, LLP

(57) ABSTRACT

A method, an apparatus, and a computer program product for wireless communication are provided. The apparatus may determine channel state information (CSI) feedback based at least in part on a channel quality information (CQI) table and a CSI reference resource size of the apparatus, wherein at least one of the CSI feedback or the CQI table is modified based at least in part on a modulation configuration of the apparatus; and report the CSI feedback. Numerous other aspects are provided.

20 Claims, 29 Drawing Sheets

(51) Int. Cl.
*H04W 72/14* (2009.01)
*H04W 72/04* (2009.01)
*H04L 1/00* (2006.01)

(52) U.S. Cl.
CPC ............ *H04L 1/0026* (2013.01); *H04L 27/34* (2013.01); *H04W 72/042* (2013.01); *H04W 72/14* (2013.01); *H04L 1/0009* (2013.01)

(56) References Cited

U.S. PATENT DOCUMENTS

| | | | | |
|---|---|---|---|---|
| 2015/0312071 | A1* | 10/2015 | Chen | H04L 1/0016 370/329 |
| 2015/0358111 | A1* | 12/2015 | Marinier | H04L 1/0003 370/329 |
| 2016/0365944 | A1 | 12/2016 | Blankenship et al. | |
| 2017/0288808 | A1 | 10/2017 | Blankenship et al. | |
| 2018/0323940 | A1 | 11/2018 | Rico Alvarino et al. | |
| 2019/0191434 | A1* | 6/2019 | Hugl | H04W 72/042 |
| 2020/0163156 | A1* | 5/2020 | Ye | H04W 8/24 |

FOREIGN PATENT DOCUMENTS

| | | |
|---|---|---|
| CN | 106134120 A | 11/2016 |
| EP | 2750308 A2 | 7/2014 |
| EP | 2879427 A1 | 6/2015 |
| JP | 2018531545 A | 10/2018 |
| KR | 20150009417 A | 1/2015 |
| WO | WO-2015103588 A1 * | 7/2015 ........... H04L 1/0001 |
| WO | 2015164251 A1 | 10/2015 |
| WO | 2016122380 A1 | 8/2016 |
| WO | 2016190804 A1 | 12/2016 |
| WO | 2017050273 A1 | 3/2017 |
| WO | 2017078603 A1 | 5/2017 |

OTHER PUBLICATIONS

International Preliminary Report on Patentability—PCT/US2018/029599, The International Bureau of WIPO—Geneva, Switzerland, dated Nov. 14, 2019.
International Search Report and Written Opinion—PCT/US2018/029599—ISA/EPO—dated Nov. 6, 2018.
Partial International Search Report—PCT/US2018/029599—ISA/EPO—dated Aug. 1, 2018.
Qualcomm Incorporated: "Updated Correction on CSI Reference Resource Definition in LAA" [online], 3GPP Draft, 3GPP TSG-RAN WG1 Meeting #86bis, R1-1613722, Lisbon, Portugal, Oct. 10-14, 2016, 13 Pages, Retrieved from the Internet URL: http://www.3gpp.org/ftp/tsg_ran/WG1_RL1/TSGR1_87/Docs/R1-1613722.zip.

* cited by examiner

CSI Ref. Res. Size = 1

| CQI index | modulation | code rate x 1024 x R_CSIMax | efficiency x R_CSIMax |
|---|---|---|---|
| 0 | | out of range | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

CSI Ref. Res. Size greater than 1

| CQI index | modulation | code rate x 1024 | Assumed R_CSIMax | efficiency x R_CSIMax |
|---|---|---|---|---|
| 0 | | out of range | | |
| 1 | QPSK | 40 | R_CSIMax | 0.0781 |
| 2 | QPSK | 78 | R_CSIMax | 0.1523 |
| 3 | QPSK | 120 | R_CSIMax | 0.2344 |
| 4 | QPSK | 193 | R_CSIMax | 0.3770 |
| 5 | QPSK | 308 | R_CSIMax | 0.6016 |
| 6 | QPSK | 449 | R_CSIMax | 0.8770 |
| 7 | QPSK | 602 | R_CSIMax | 1.1758 |
| 8 | 16QAM | 378 | R_CSIMax | 1.4766 |
| 9 | 16QAM | 490 | R_CSIMax | 1.9141 |
| 10 | 16QAM | 616 | R_CSIMax | 2.4063 |
| 11 | 64QAM | 466 | 1 | 2.7305 |
| 12 | 64QAM | 567 | 1 | 3.3223 |
| 13 | 64QAM | 666 | 1 | 3.9023 |
| 14 | 64QAM | 772 | 1 | 4.5234 |
| 15 | 64QAM | 873 | 1 | 5.1152 |

Table 1800 — CSI Ref. Res. Size = 1 (1810):

| CQI index | modulation | code rate x 1024 x R_CSIMax | efficiency x R_CSIMax |
|---|---|---|---|
| 0 | out of range | | |
| 1 | QPSK | 40 | 0.0781 |
| 2 | QPSK | 78 | 0.1523 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 567 | 3.3223 |
| 13 | 64QAM | 666 | 3.9023 |
| 14 | 64QAM | 772 | 4.5234 |
| 15 | 64QAM | 873 | 5.1152 |

CSI Ref. Res. Size greater than 1 (1814):

| CQI index | modulation | code rate x 1024 | Assumed R_CSIMax | efficiency x R_CSI Max |
|---|---|---|---|---|
| 0 | out of range | | | |
| 1 | QPSK | 40 | R_CSIMax | 0.0781 |
| 2 | QPSK | 78 | R_CSIMax | 0.1523 |
| 3 | QPSK | 120 | R_CSIMax | 0.2344 |
| 4 | QPSK | 193 | R_CSIMax | 0.3770 |
| 5 | QPSK | 308 | R_CSIMax | 0.6016 |
| 6 | QPSK | 449 | R_CSIMax | 0.8770 |
| 7 | QPSK | 602 | R_CSIMax | 1.1758 |
| 8 | 16QAM | 378 | R_CSIMax | 1.4766 |
| 9 | 16QAM | 490 | R_CSIMax | 1.9141 |
| 10 | 16QAM | 616 | R_CSIMax | 2.4063 |
| 11 | 16QAM | 378 | R_CSIMax/2 | 2.7305 |
| 12 | 16QAM | 490 | R_CSIMax/2 | 3.3223 |
| 13 | 16QAM | 616 | R_CSIMax/2 | 3.9023 |
| 14 | 64QAM | 466 | 1 | 4.5234 |
| 15 | 64QAM | 567 | 1 | 5.1152 |

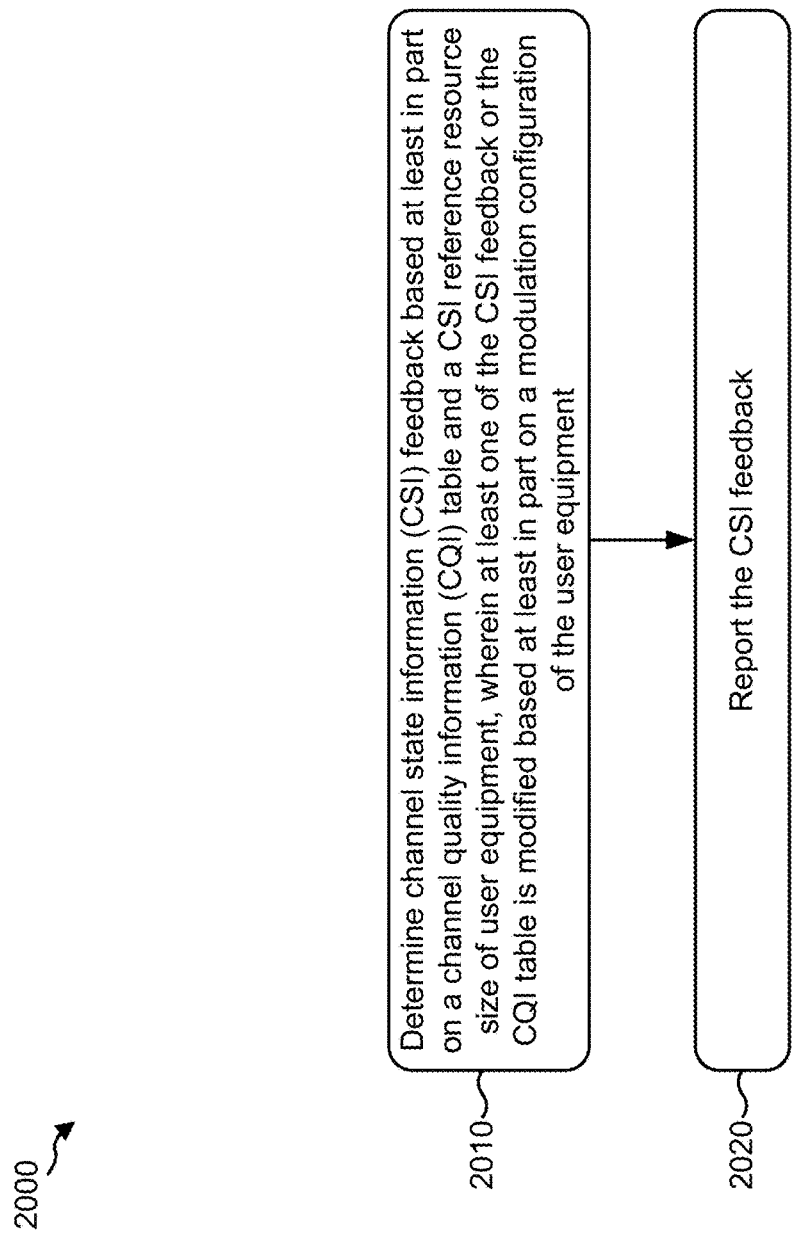

TECHNIQUES AND APPARATUSES FOR CHANNEL STATE INFORMATION FEEDBACK PERFORMANCE FOR INTRODUCTION OF 64-QAM IN MACHINE TYPE COMMUNICATION DEVICES

CROSS-REFERENCE TO RELATED APPLICATIONS UNDER 35 U.S.C. § 119

This application is a divisional of U.S. patent application Ser. No. 15/962,682, filed Apr. 25, 2018, entitled "TECHNIQUES AND APPARATUSES FOR CHANNEL STATE INFORMATION FEEDBACK PERFORMANCE FOR INTRODUCTION OF 64-QAM IN MACHINE TYPE COMMUNICATION DEVICES," which claims priority to Indian Patent Application No. 201741015896, filed May 5, 2017, entitled "TECHNIQUES AND APPARATUSES FOR FALLBACK AND MODULATION DETERMINATION FOR INTRODUCTION OF 64-QAM IN MACHINE TYPE COMMUNICATION DEVICES," and to Indian Patent Application No. 201741022578, filed Jun. 28, 2017, entitled TECHNIQUES AND APPARATUSES FOR CHANNEL STATE INFORMATION FEEDBACK PERFORMANCE FOR INTRODUCTION OF 64-QAM IN MACHINE TYPE COMMUNICATION DEVICES," which are hereby expressly incorporated by reference herein.

TECHNICAL FIELD OF THE DISCLOSURE

Aspects of the technology described below generally relate to wireless communication, and more particularly to techniques and apparatuses for channel state information feedback performance for introduction of 64-quadrature amplitude modulation (QAM) in machine type communication (MTC) devices. Embodiments and techniques enable and provide wireless communication devices and systems configured for improved efficiency and versatility for communications between MTC user equipment and base stations that are associated with a higher modulation order (e.g., 64-QAM and/or the like).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B. and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread orthogonal frequency division multiplexing (OFDM) (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method may include receiving, by a UE configured to use a first modulation order associated with a first modulation and coding scheme (MCS) table, a grant for downlink traffic; and/or decoding, by the UE, the downlink traffic based at least in part on a modulation order and a transport block size (TBS) selected based at least in part on the grant, wherein the UE is configured to select the modulation order and the TBS based at least in part on whether the grant indicates at least two repetitions of the downlink traffic, and wherein the UE is configured to select the modulation order from the first modulation order or a second modulation order, associated with a second MCS table, that is lower than the first modulation order.

In some aspects, a user equipment may include a memory and at least one processor operatively coupled to the memory. The memory and the at least one processor may be configured to receive a grant for downlink traffic, wherein the apparatus is capable of using a first modulation order corresponding to a first MCS table and a second modulation order, corresponding to a second MCS table, that is lower than the first modulation order; and/or decode the downlink traffic according to the first modulation order or the second modulation order based at least in part on whether the grant is received in a UE-specific search space or a common search space.

In some aspects, an apparatus may include means for receiving a grant for downlink traffic, wherein the apparatus is capable of using a first modulation order corresponding to a first MCS table and a second modulation order, corresponding to a second MCS table, that is lower than the first modulation order; and/or means for decoding the downlink traffic according to the first modulation order or the second modulation order based at least in part on whether the grant is received in a UE-specific search space or a common search space.

In some aspects, a computer program product may include a non-transitory computer-readable medium storing computer executable code. The code may include code for receiving, by a UE, a grant for downlink traffic, wherein the UE is capable of using a first modulation order corresponding to a first MCS table and a second modulation order, corresponding to a second MCS table, that is lower than the first modulation order; and/or code for decoding, by the UE, the downlink traffic according to the first modulation order or the second modulation order based at least in part on whether the grant is received in a UE-specific search space or a common search space.

In some aspects, a method may include receiving, by a UE configured to use a first modulation order associated with a first MCS table, a grant for downlink traffic; and/or decoding, by the UE, the downlink traffic based at least in part on a modulation order and a TBS selected based at least in part on the grant, wherein the UE is configured to select the modulation order and the TBS based at least in part on whether the grant indicates at least two repetitions of the downlink traffic, and wherein the UE is configured to select the modulation order from the first modulation order or a second modulation order, associated with a second MCS table, that is lower than the first modulation order.

In some aspects, a user equipment may include a memory and at least one processor operatively coupled to the memory. The memory and the at least one processor may be configured to receive, by the user equipment configured to use a first modulation order associated with a first MCS table, a grant for downlink traffic; and/or decode the downlink traffic based at least in part on a modulation order and a TBS selected based at least in part on the grant, wherein the apparatus is configured to select the modulation order and the TBS based at least in part on whether the grant indicates at least two repetitions of the downlink traffic, and wherein the apparatus is configured to select the modulation order from the first modulation order or a second modulation order, associated with a second MCS table, that is lower than the first modulation order.

In some aspects, an apparatus may include means for receiving, by the apparatus configured to use a first modulation order associated with a first MCS table, a grant for downlink traffic; and/or means for decoding the downlink traffic based at least in part on a modulation order and a TBS selected based at least in part on the grant, wherein the apparatus is configured to select the modulation order and the TBS based at least in part on whether the grant indicates at least two repetitions of the downlink traffic, and wherein the apparatus is configured to select the modulation order from the first modulation order or a second modulation order, associated with a second MCS table, that is lower than the first modulation order.

In some aspects, a computer program product may include a non-transitory computer-readable medium storing computer executable code. The code may include code for receiving, by a UE configured to use a first modulation order associated with a first MCS table, a grant for downlink traffic; and/or decoding, by the UE, the downlink traffic based at least in part on a modulation order and a TBS selected based at least in part on the grant, wherein the UE is configured to select the modulation order and the TBS based at least in part on whether the grant indicates at least two repetitions of the downlink traffic, and wherein the UE is configured to select the modulation order from the first modulation order or a second modulation order, associated with a second MCS table, that is lower than the first modulation order.

In some aspects, a method may include receiving, by a user equipment (UE) configured to use a first modulation order associated with a first modulation and coding scheme (MCS) table, a grant for downlink traffic, wherein the grant identifies a resource allocation; determining, by the UE, a transport block size (TBS) based at least in part on the first MCS table; and/or decoding, by the UE, the downlink traffic according to the TBS and a selected modulation order, wherein the selected modulation order is selected from the first modulation order and a second modulation order, associated with a second MCS, that is lower than the first modulation order, based at least in part on the resource allocation and the TBS.

In some aspects, a user equipment may include a memory and at least one processor operatively coupled to the memory. The memory and the at least one processor may be configured to receive, by the user equipment configured to use a first modulation order associated with a first MCS table, a grant for downlink traffic, wherein the grant identifies a resource allocation; determine a TBS based at least in part on the first MCS table; and/or decode the downlink traffic according to the TBS and a selected modulation order, wherein the selected modulation order is selected from the first modulation order and a second modulation order, associated with a second MCS, that is lower than the first modulation order, based at least in part on the resource allocation and the TBS.

In some aspects, an apparatus may include means for receiving, by the apparatus configured to use a first modulation order associated with a first MCS table, a grant for downlink traffic, wherein the grant identifies a resource allocation; means for determining a TBS based at least in part on the first MCS table; and/or means for decoding the downlink traffic according to the TBS and a selected modulation order, wherein the selected modulation order is selected from the first modulation order and a second modulation order, associated with a second MCS, that is lower than the first modulation order, based at least in part on the resource allocation and the TBS.

In some aspects, a computer program product may include a non-transitory computer-readable medium storing computer executable code. The code may include code for receiving, by a UE configured to use a first modulation order associated with a first MCS table, a grant for downlink traffic, wherein the grant identifies a resource allocation; determining, by the UE, a TBS based at least in part on the first MCS table; and/or decoding, by the UE, the downlink traffic according to the TBS and a selected modulation order, wherein the selected modulation order is selected from the first modulation order and a second modulation order, associated with a second MCS, that is lower than the first modulation order, based at least in part on the resource allocation and the TBS.

In some aspects, a method may be performed by the UE, and may include receiving a grant identifying a number of repetitions; and/or determining whether the grant is valid based at least in part on at least one of the number of repetitions, a channel state information (CSI) reference resource size, or a modulation configuration of the user equipment.

In some aspects, a user equipment may include a memory and at least one processor operatively coupled to the memory. The memory and the at least one processor may be configured to receive a grant identifying a number of repetitions; and/or determine whether the grant is valid based at least in part on at least one of the number of repetitions, a CSI reference resource size, or a modulation configuration of the apparatus.

In some aspects, an apparatus may include means for receiving a grant identifying a number of repetitions; and/or means for determining whether the grant is valid based at least in part on at least one of the number of repetitions, a CSI reference resource size, or a modulation configuration of the apparatus.

In some aspects, a computer program product may include a non-transitory computer-readable medium storing computer executable code. The code may include code for receiving a grant identifying a number of repetitions; and/or code for determining whether the grant is valid based at least in part on at least one of the number of repetitions, a CSI reference resource size, or a modulation configuration of the user equipment.

In some aspects, a method may be performed by a user equipment, and may include determining CSI feedback based at least in part on a channel quality information (CQI) table and a configured CSI reference resource size of the user equipment, wherein at least one of the CSI feedback or the CQI table is modified based at least in part on a modulation configuration of the user equipment; and/or reporting the CSI feedback.

In some aspects, a user equipment may include a memory and at least one processor operatively coupled to the memory. The memory and the at least one processor may be configured to determine CSI feedback based at least in part on a CQI table and a configured CSI reference resource size of the apparatus, wherein at least one of the CSI feedback or the CQI table is modified based at least in part on a modulation configuration of the apparatus, and/or report the CSI feedback.

In some aspects, an apparatus may include means for determining CS feedback based at least in part on a CQI table and a configured CS reference resource size of the apparatus, wherein at least one of the CSI feedback or the CQI table is modified based at least in part on a modulation configuration of the apparatus; and/or means for reporting the CSI feedback.

In some aspects, a computer program product may include a non-transitory computer-readable medium storing computer executable code. The code may include code for determining CSI feedback based at least in part on a CQI table and a configured CS reference resource size, wherein at least one of the CSI feedback or the CQI table is modified based at least in part on a modulation configuration; and/or code for reporting the CSI feedback.

Aspects generally include a method, apparatus, system, computer program product, non-transitory computer-readable medium, user equipment, wireless communication device, base station, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIGS. 18A-18C are diagrams illustrating examples of selectively using a modified table to determine CSI feedback.

FIG. 20 is a flow chart of a method of wireless communication.

DETAILED DESCRIPTION

Figure 1:
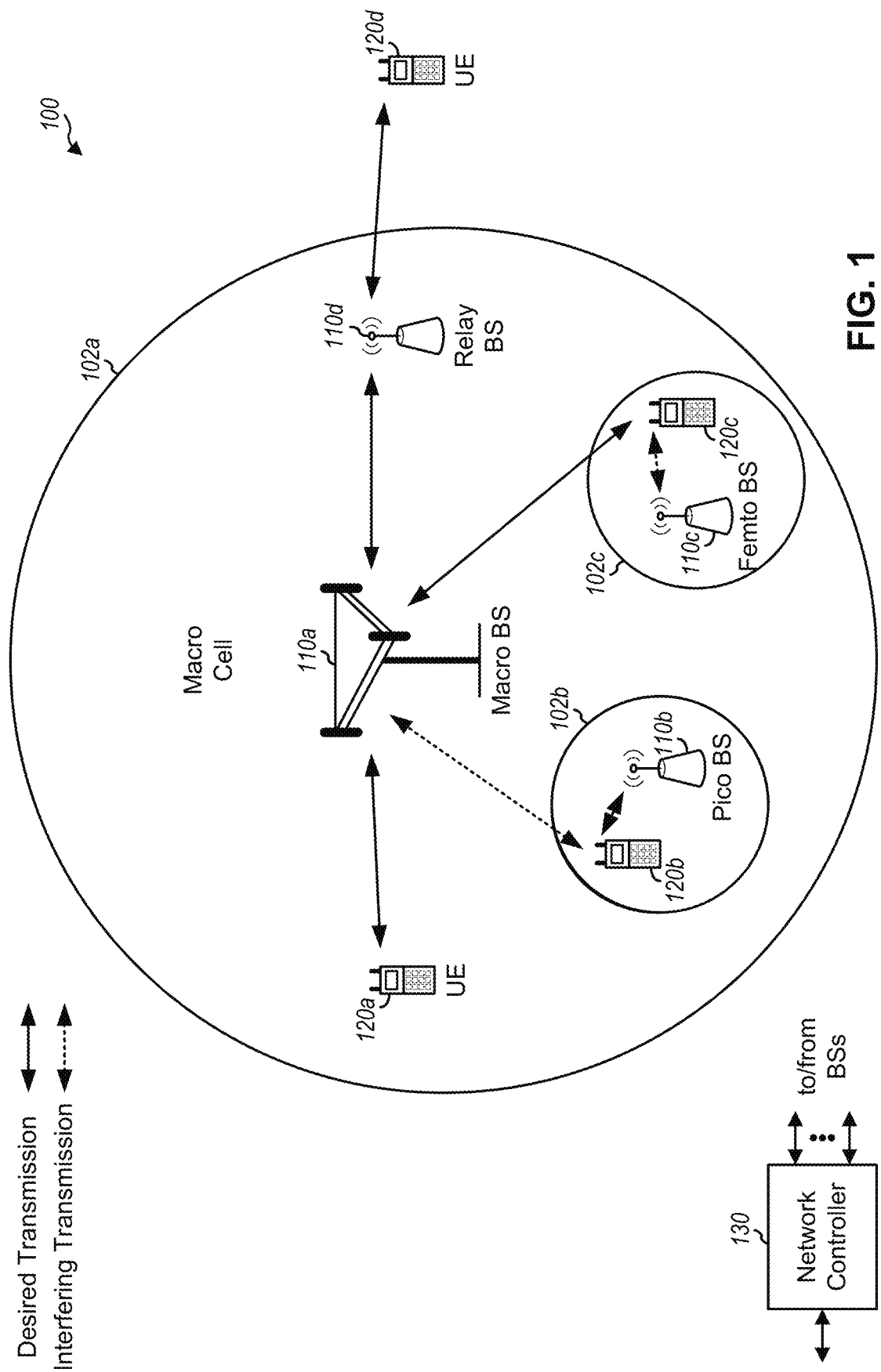
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs. and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
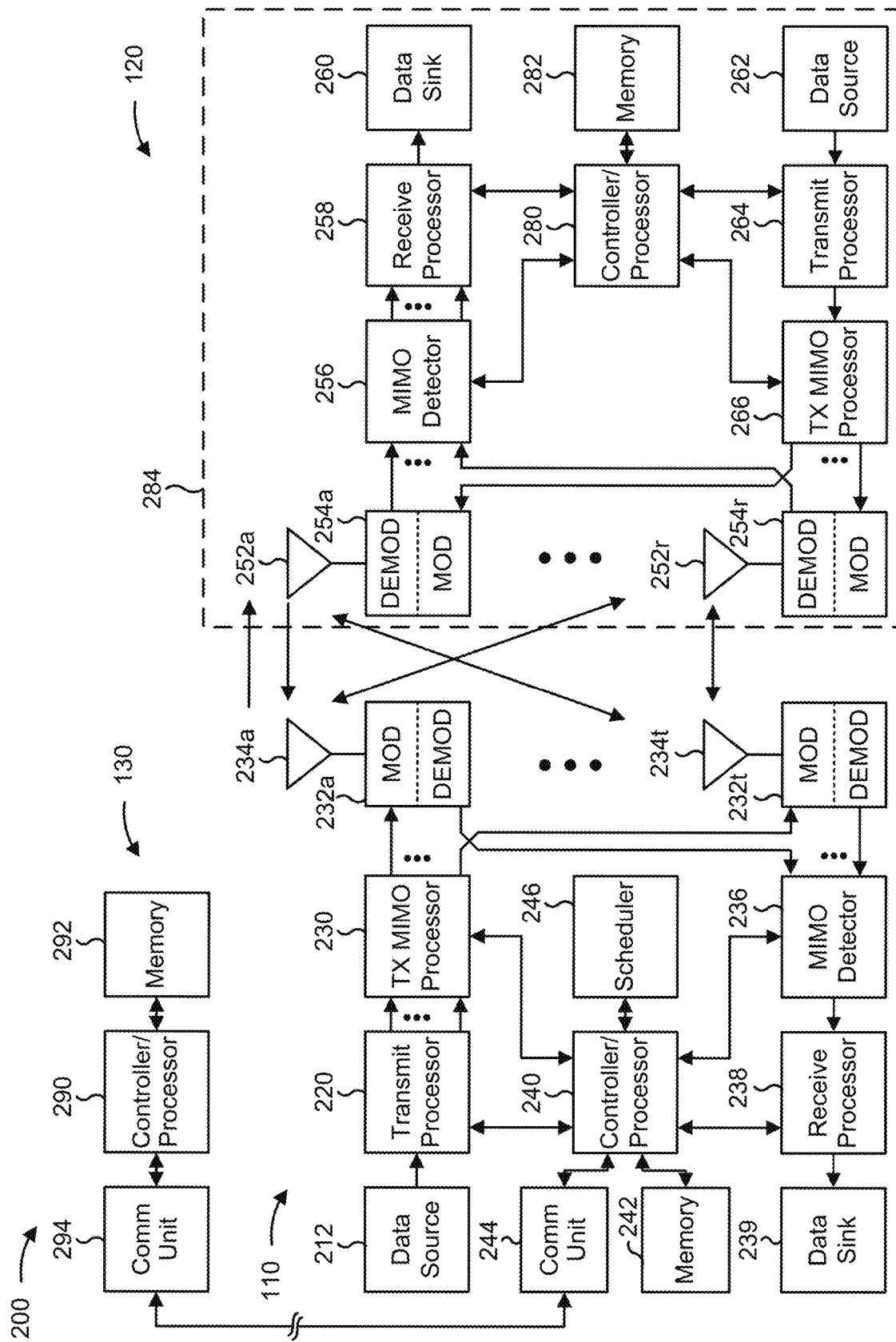
FIG. 2 is a diagram illustrating an example of a base station in communication with a user equipment (UE) in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for discrete Fourier Transform (DFT)-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to perform fallback and modulation determination for introduction of 64-QAM in MTC devices. For example, controller/processor 280 and/or other processors and modules at BS 110, may perform or direct operations of UE 120 to perform fallback and modulation determination for introduction of 64-QAM in MTC devices. For example, controller/processor 280 and/or other controllers/processors and modules at BS 110 may perform or direct operations of, for example, method 1000 of FIG. 10, method 1200 of FIG. 12, method 1400 of FIG. 14, and/or other methods as described herein. In some aspects, one or more of the components shown in FIG. 2 may be employed to perform example method 1000 of FIG. 10, example method 1200 of FIG. 12, example method 1400 of FIG. 14, and/or other methods for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
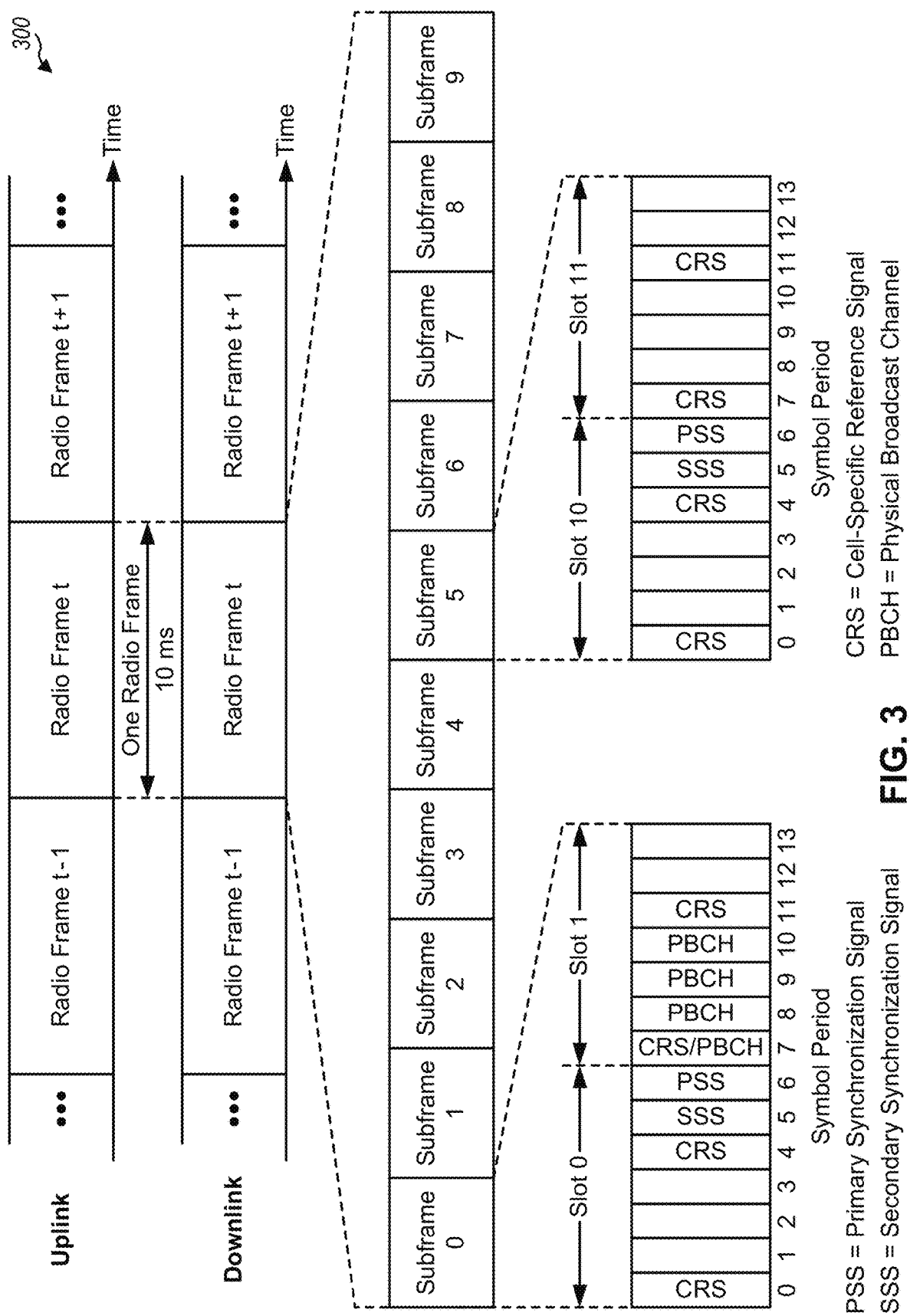
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
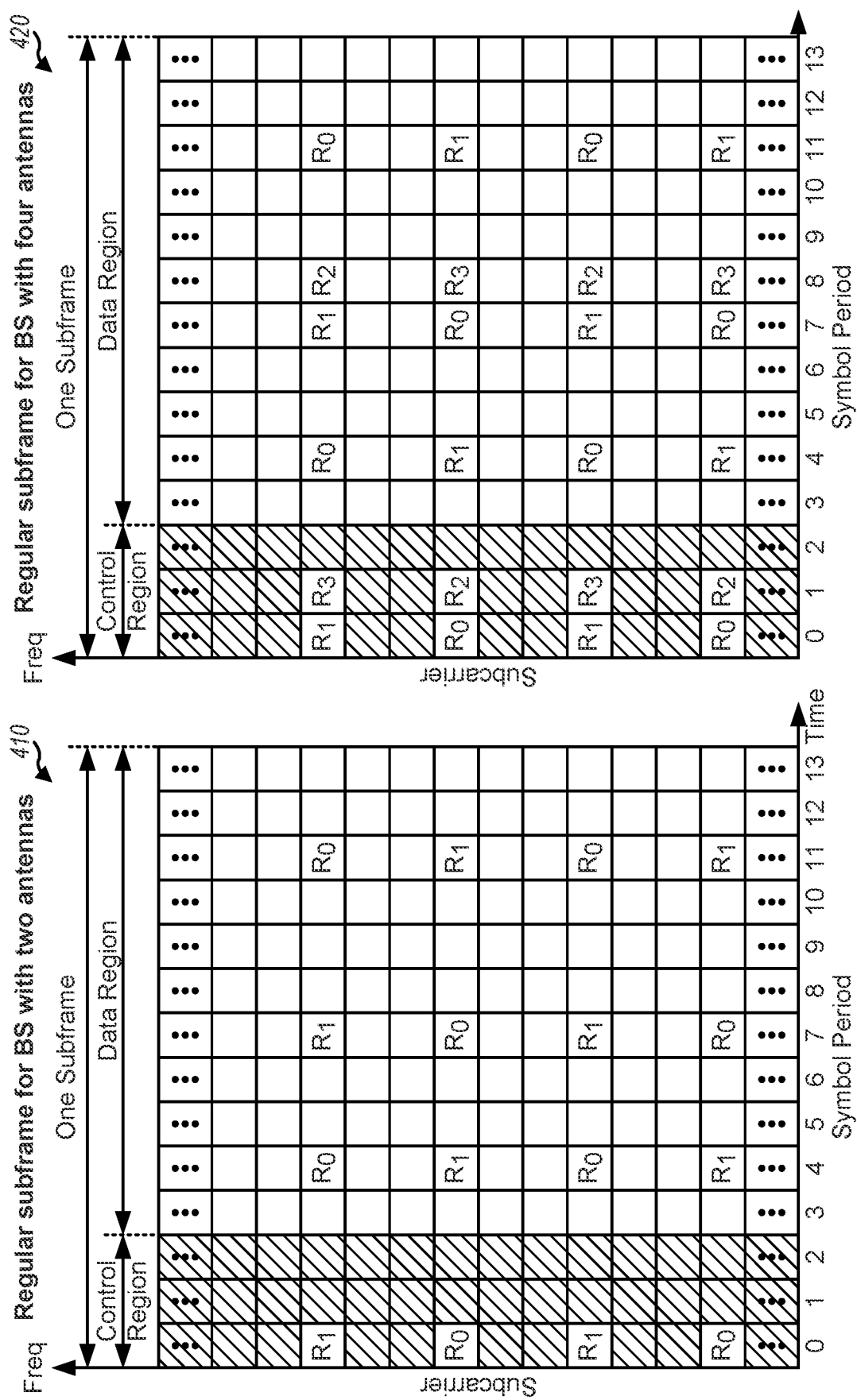
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where q∈{0, . . . , Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
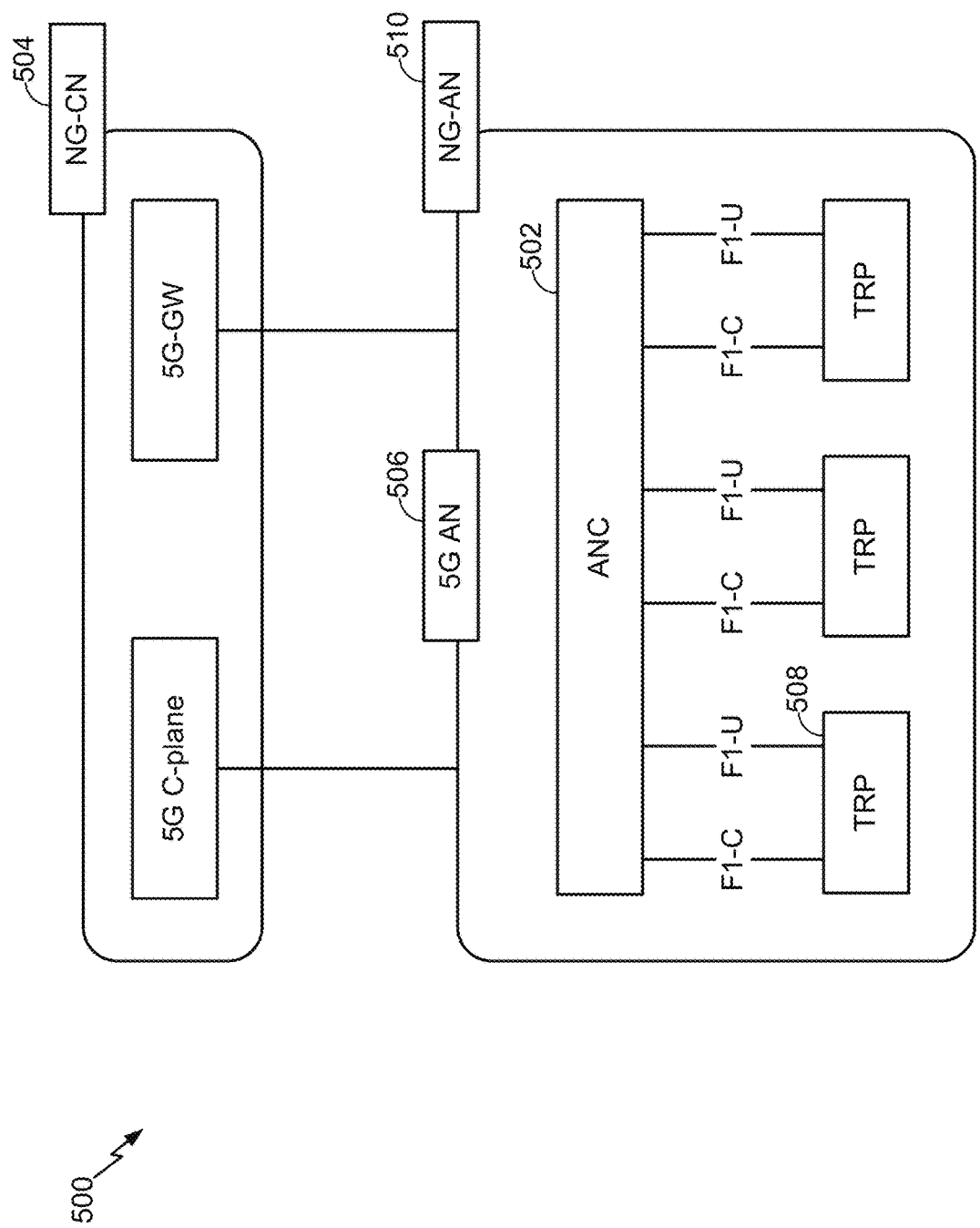
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs. NR BSs. Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC). MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
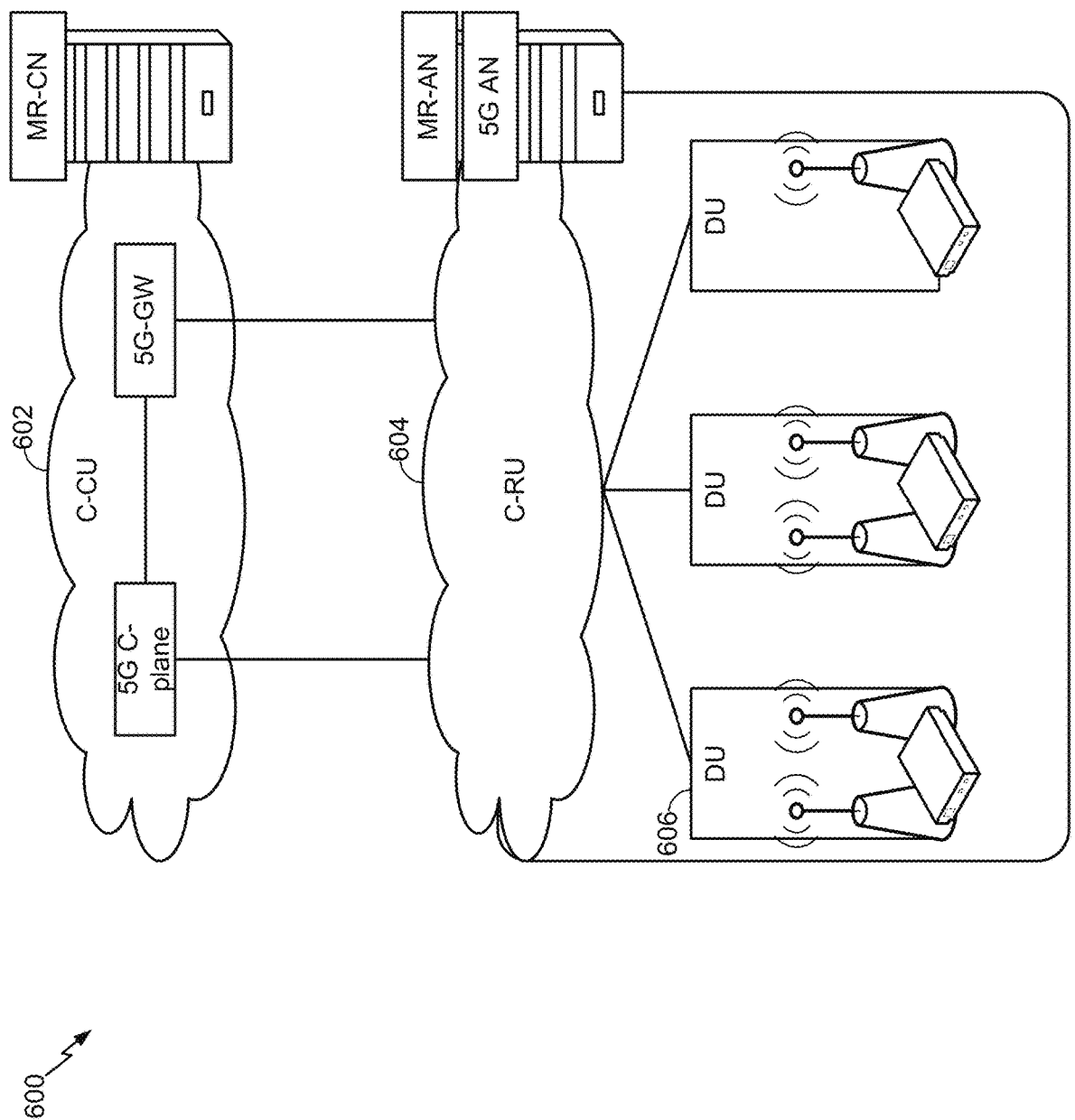
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
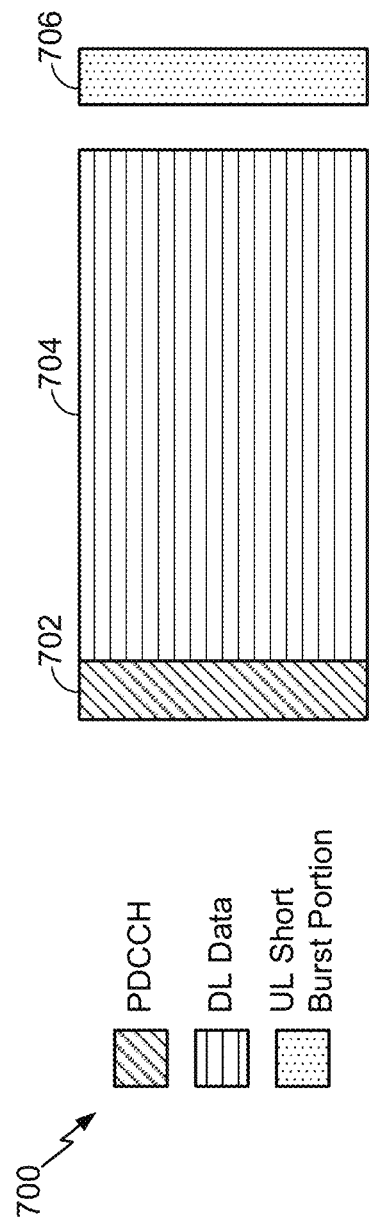
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an acknowledgment (ACK) signal (e.g., a physical uplink control channel (PUCCH) ACK, a physical uplink shared channel (PUSCH) ACK, an immediate ACK), a non-ACK (NACK) signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
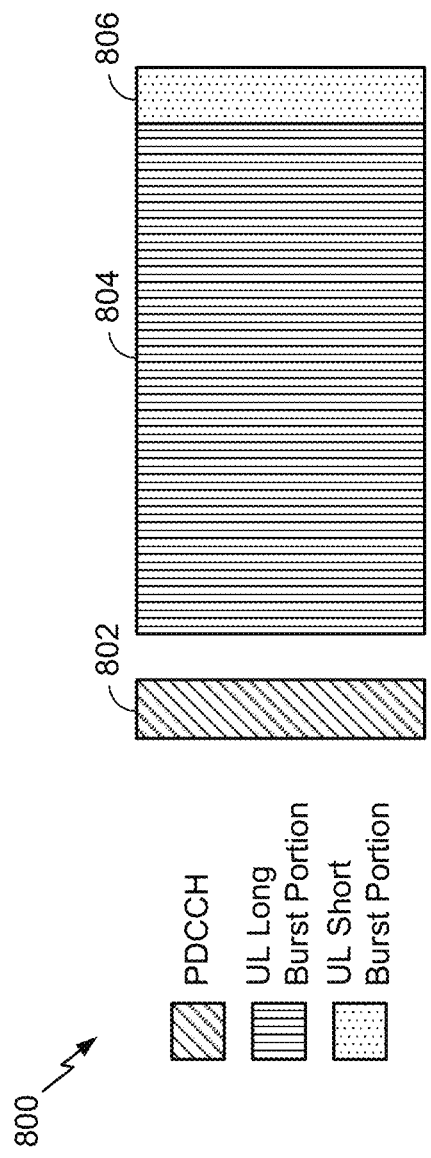
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH).

The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services. UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

A BS 110 and a UE 120 may communicate using a particular modulation order to encode traffic. For example, the modulation order may correspond to a modulation scheme (e.g., quadrature phase shift keying (QPSK) associated with modulation order 4, 16-quadrature amplitude modulation (16-QAM) associated with modulation order 6, 64-QAM associated with modulation order 8, and so on). A higher modulation order may provide a higher throughput, but may require better signal to noise ratio (SNR) and/or better operating conditions than a lower modulation order. Therefore, the modulation order used for a UE 120 may decrease as the UE 120 moves farther from a BS 110 and/or as channel conditions of the UE 120 worsen. In such a case, the lower modulation order may be considered to be more robust than the higher modulation order.

As bandwidth and throughput needs increase, some standards are moving toward usage of higher modulation orders. For example, 64-QAM on the downlink may be implemented for machine type communication (MTC) UEs as part of an upcoming Third Generation Partnership Project (3GPP) release. In such a case, the 64-QAM modulation order may be restricted to non-repeated unicast downlink traffic provided using a PDSCH, and may be enabled or disabled by an eNB (or BS 110) via UE-specific signaling, such as downlink control information (DCI). Furthermore, MTC UEs may use a particular format of DCI. As one possible example, the particular format may include DCI format 6-1A as defined by 3GPP specification 36.302. As used herein, non-repeated traffic may refer to traffic that is not associated with a predefined number of repetitions. For example, a BS 110 may specify a number of repetitions (e.g., R=2, 3, 4, etc.) for traffic, and a UE 120 may not transmit an ACK/NACK for the traffic until the specified number of repetitions are received. In some aspects described herein, 64-QAM downlink traffic may be limited to single-repetition traffic (R=1).

The use of 64-QAM (or other higher-order modulation schemes) may present certain difficulties for MTC UEs and/or other UEs that use the higher-order modulation schemes. For example, the modulation scheme may be indicated to the UE 120 in a DCI, but interpretation of the modulation scheme may be performed according to a table associated with a higher modulation scheme (e.g., a 64-QAM table) or a table associated with a lower modulation scheme (e.g., a 16-QAM table). In such cases, a BS 110 may indicate which table to use for a grant by providing the grant in a UE-specific search space or a common search space. In such a case, it may be difficult to tell whether a grant received in an overlapping search space (e.g., a portion of a control channel that is associated with a UE-specific search space and a common search space) is associated with a higher-order modulation scheme and/or table or a lower-order modulation scheme and/or table. Additionally, or alternatively, since 64-QA M may be implemented only for traffic that is not associated with repetitions, it may be helpful to develop a process for handling grants associated with 64-QA M and multiple repetitions. Additionally, or alternatively, some UEs 120, such as MTC UEs, may be associated with limited buffer sizes. In such a case, rate matching by the UE 120 may not be configured optimally for higher-order modulation schemes. For example, when an MTC UE is configured to use 64-QAM with a limited buffer size, it is possible that 64-QAM may be sub-par for some resource allocations, and it would be more efficient or reliable to use 16-QAM or another lower-order modulation scheme.

Furthermore, a UE 120 may generate CSI feedback based at least in part on a CSI reference resource. In legacy RATs, such as LTE, the CSI reference resource may occupy a single subframe. In such a case, the UE 120 may monitor the single subframe to determine a channel quality indicator (CQI), and may generate a CSI report based at least in part on the CQI, channel conditions, or other characteristics of the air interface during the single subframe. However, with the advent of repetitious traffic associated with MTC UEs and the like, techniques have been proposed for defining a flexible CSI reference resource size. For example, for a UE 120 receiving traffic with multiple repetitions, a CSI reference resource size may be specified that encompasses the multiple repetitions.

As one example, a CSI reference resource size may be specified by a parameter csi-NumRepetitionCE, defined in 3GPP Technical Specification 36.213, Clause 7.2.3. In some aspects, such as in connection with FIGS. 18A-18C below, csi-NumRepetitionCE may be referred to as R_CSIMax. When csi-NumRepetitionCE is equal to 1. CSI feedback is performed assuming 1 repetition of downlink traffic. When csi-NumRepetitionCE is equal to 2, CSI feedback is performed assuming 2 repetitions of downlink traffic. In such a case, the CQI may be determined as a maximum MCS index, with a number of repetitions corresponding to a value of csi-NumRcpetitionCE, that can be received with a block error rate (BLER) less than a threshold (e.g., 0.1).

The CSI reference resource size may be configured using radio resource control (RRC) signaling and/or the like. Therefore, it may be cumbersome to change the CSI reference resource size on the fly. Furthermore, when csi-Num-RepetitionCE is greater than 1, repetition of downlink traffic may be allowed, whereas, when csi-NumRepetitionCE is equal to 1, repetition of downlink traffic may not be allowed. Therefore, it may be difficult for UE 120 to support 64-QAM (which may be usable only with a single repetition) and lower modulation orders with multiple repetitions (e.g., 16-QAM and/or the like) with the same RRC signaling. This may be especially undesirable when coverage changes frequently, necessitating frequent switches between CSI reference resource sizes, repetition schemes, and modulation schemes, which may requires RRC signaling overhead.

Techniques and apparatuses, described herein, may provide improved efficiency and versatility for communications between MTC UEs and BSs that are associated with a higher modulation order.

In some aspects described herein, a UE 120 (or a BS 110) may determine whether to use a higher-order modulation scheme for downlink traffic, or may select a table for determining TBS and modulation scheme, based at least in part on whether a grant for the downlink traffic is in the UE-specific search space or the common search space. When the grant is in an overlapping search space, the UE 120 may determine whether to use the higher-order modulation scheme or may select the table based at least in part on information included in the grant, or based at least in part on a predefined modulation order. In this way, versatility of downlink grants is improved by enabling usage of an overlapping search space for the downlink grants.

In some aspects described herein, a UE 120 (or a BS 110) may select a modulation order and a transport block size (TBS) based at least in part on a quantity of repetitions indicated by a downlink grant. For example, the UE 120 may decrease a modulation order when repetitions are indicated and/or may use a TBS associated with a higher modulation and coding scheme, which may enable transmission of larger payloads at lower modulation orders. In this way, versatility of downlink grants at higher modulation orders is further improved and robustness of communications between the UE 120 and the BS 110 at higher modulation orders is improved.

In some aspects described herein, a UE 120 (or a BS 110) may select a modulation order based at least in part on a resource allocation and a TBS of a downlink grant. For example, the UE 120 may select a lower modulation order when the resource allocation satisfies a threshold with regard to the TBS. In this way, rate matching between the UE 120 and the BS 110 is improved in a situation where 64-QAM may not be an ideal modulation scheme (e.g., when resource allocation indicates that the soft buffer of the UE 120 may not be sufficient or optimal for 64-QAM).

In some aspects described herein, a UE 120 may receive a grant identifying a number of repetitions, and may determine whether the grant is valid based at least in part on at least one of the number of repetitions, a CSI reference resource size of the UE 120, and/or a modulation configuration of the UE 120. For example, the UE 120 may discard grants identifying an incompatible modulation scheme, number of repetitions, or CSI reference resource size. As another example, the UE 120 may selectively override a number of repetitions or CSI reference resource size based at least in part on a received parameter indicating that the number of repetitions or CSI reference resource size are to be overridden. Additionally. or alternatively, the UE 120 may discard configuration information (e.g., RRC signaling) that indicates a CSI reference resource size that is incompatible with a modulation configuration of the UE 120. Thus, robustness of the UE 120 in situations where the modulation configuration and/or the number of repetitions are likely to change is improved.

In some aspects described herein, the UE 120 may determine CSI feedback based at least in part on a CQI table and a CSI reference resource size, wherein at least one of the CSI feedback or the CQI table is modified based at least in part on a modulation configuration of the UE 120. For example, the UE 120 may use a CQI table that removes CQI indexes associated with a particular CSI reference resource size when the particular CSI reference resource size is incompatible with a modulation scheme of the UE 120. Additionally, or alternatively, the UE 120 may use a CQI table wherein one or more CSI reference resource size values are replaced with values compatible with a corresponding modulation scheme and/or repetition scheme. Thus, a frequency of RRC reconfiguration of the CSI reference resource size of the UE 120 is reduced, and versatility of the UE 120 with regard to different modulation schemes, CSI reference resource sizes, and repetition schemes is improved.

FIGS. 9A-9D are diagrams illustrating examples 900 of selecting a modulation order for decoding traffic based at least in part on a search space in which a grant for the traffic is received.

Figure 9A:
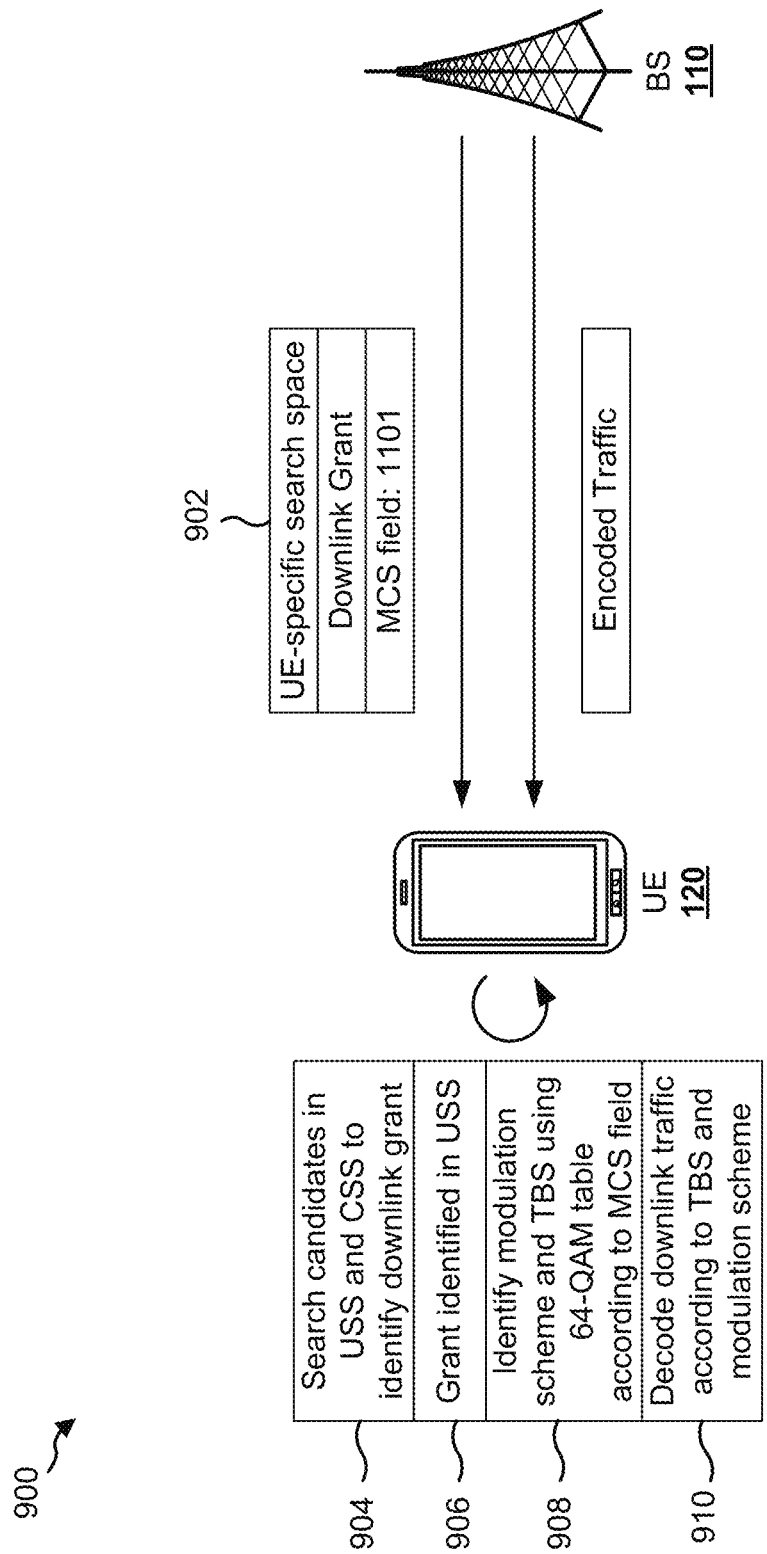
FIGS. 9A-9D are diagrams illustrating examples of selecting an MCS table for decoding traffic based at least in part on a search space in which a grant for the traffic is received.

FIG. 9A is an example of using a higher modulation order and corresponding TBS to decode downlink traffic based at least in part on receiving a grant for the downlink traffic in a UE-specific search space. As shown in FIG. 9A, and by reference number 902, a BS 110 may provide a downlink grant to a UE 120 in a UE-specific search space. For example, BS 110 or another scheduling entity may schedule downlink traffic for UEs 120 that are in a coverage area of a cell provided by the BS 110. The BS 110 may allocate particular resource blocks (RBs) for downlink traffic to the UEs 120. The BS 110 may provide grants identifying scheduling information to the UEs 120 indicating which RBs are allocated for each UE 120. The BS 110 may encode or mask the scheduling information for a particular UE 120 based at least in part on information specific to the particular UE 120. The particular UE 120 may receive candidate grants including scheduling information for all UEs 120 covered by the cell in a downlink control channel (e.g., a PDCCH) provided by the cell. As shown by reference number 904, the UE 120 may search candidate grants in the UE-specific search space to identify the downlink grant. For example, the particular UE 120 may attempt to decode the candidate grants using the information specific to the particular UE 120. When the particular UE 120 successfully decodes one or more of the grants, as shown by reference number 906, the particular UE 120 may use the decoded one or more grants to decode downlink traffic scheduled for the particular UE 120. In this way, grants of scheduling information for a plurality of UEs 120 is provided on a control channel that is transmitted to the plurality of UEs 120, and a UE 120 can find a candidate grant that corresponds to that UE 120.

As further shown, the downlink grant may include an MCS field that identifies an MCS of the downlink grant (e.g., 1101, corresponding to an MCS of 13). For example, the BS 110 may determine the MCS field according to channel conditions and/or according to aspects described herein. The UE 120 may determine a modulation order and a TBS based at least in part on the MCS field, as described herein, and may decode downlink traffic (e.g., a PDSCH) based at least in part on the modulation order and the TBS.

The BS 110 may provide the grant in the UE-specific search space to indicate that a higher modulation order (e.g., 64-QAM) is to be used to decode downlink communications to the UE 120. For example, the BS 110 may determine that channel conditions can support the higher modulation order, and may therefore use the higher modulation order to encode the downlink traffic. The BS 110 may provide the grant in the UE-specific search space to indicate that an MCS table corresponding to a higher modulation order is to be used to determine a modulation order and/or TBS for the downlink traffic, as is described in more detail below.

As shown by reference number 908, the UE 120 may identify a modulation scheme and a TBS using a 64-QAM table according to the MCS identified by the MCS field. For example, the UE 120 may use a table associated with a higher modulation order to determine the modulation scheme and the TBS. In this way, the BS 110 indicates that the modulation scheme indicated by the MCS table associated with the higher modulation order, and a TBS associated with the MCS table, is to be used by providing the downlink grant in the UE-specific search space, which allows the BS 110 to use existing formatting of DCI to provide the downlink grant. As shown by reference number 910, the UE 120 may decode the downlink traffic according to the identified TBS and the modulation scheme (e.g., 64-QAM).

Figure 9B:
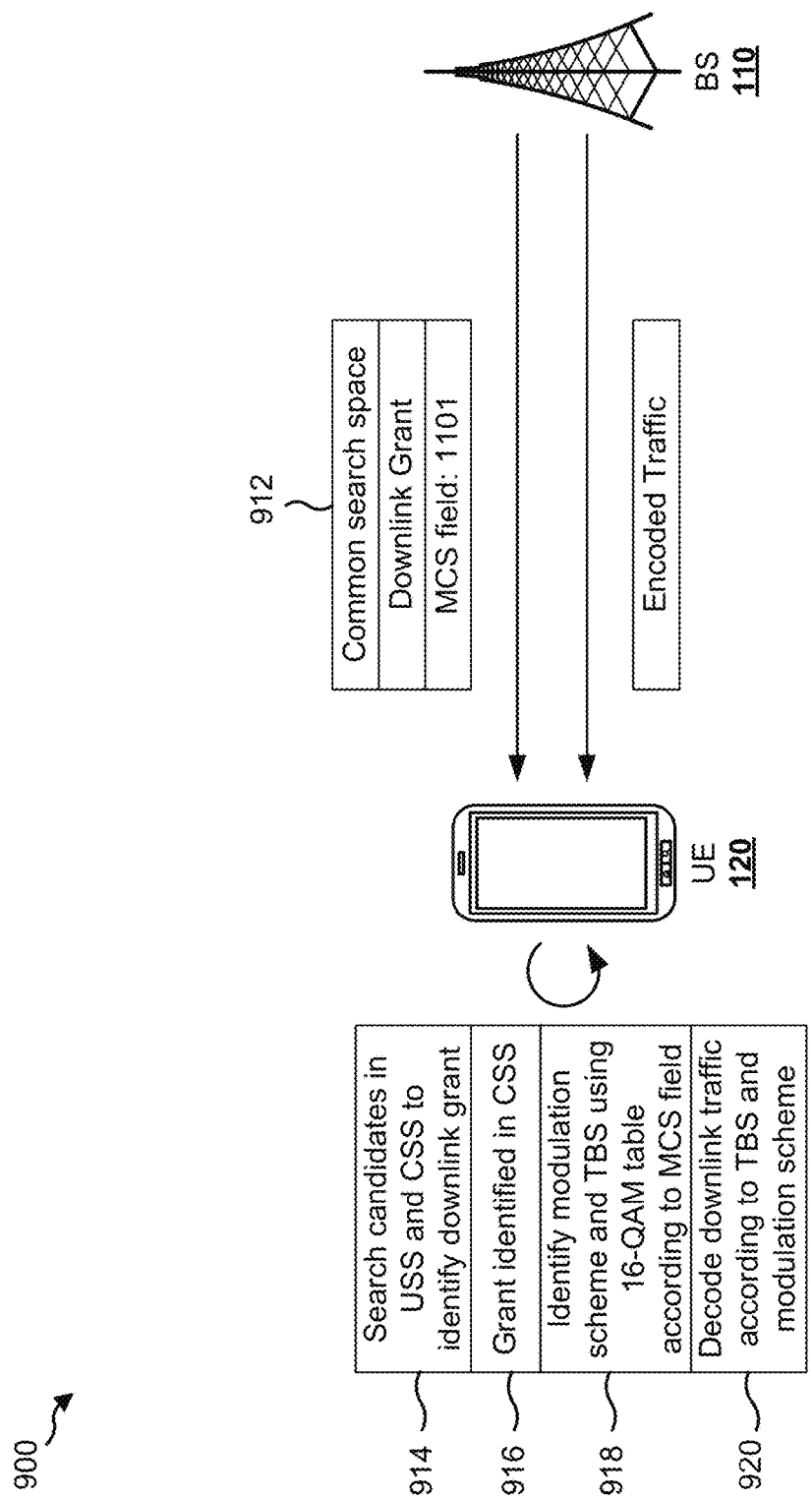

FIG. 9B is an example of using a lower modulation scheme and corresponding TBS to decode downlink traffic based at least in part on receiving a grant for the downlink traffic in a common search space. As shown in FIG. 9B, and by reference number 912, the BS 110 may provide a downlink grant to the UE 120 in a common search space. For example, the BS 110 may determine that a lower modulation scheme is to be used for downlink traffic, may encode the downlink traffic according to the lower modulation scheme, and may provide the grant for the downlink traffic in the common search space to indicate than an MCS table associated with the lower modulation scheme is to be used to select a modulation scheme and TBS for decoding the downlink traffic.

As shown by reference number 914, the UE 120 may search candidate grants in the UE-specific search space (USS) and the common search space (CSS) to identify the downlink grant. As shown by reference number 916, the UE 120 may identify the downlink grant in the common search space. As shown by reference number 918, the UE 120 may identify or select the modulation scheme and the TBS for decoding the downlink traffic according to a 16-QAM table and according to the MCS identified by the MCS field of the downlink grant. In this way, the BS 110 causes a lower modulation scheme and TBS to be used in connection with FIG. 9B than in connection with FIG. 9A, even though the MCS field is identical, by providing the grant in a different search space. As shown by reference number 920, the UE 120 may decode the downlink traffic according to the TBS and the modulation scheme.

Figure 9C:
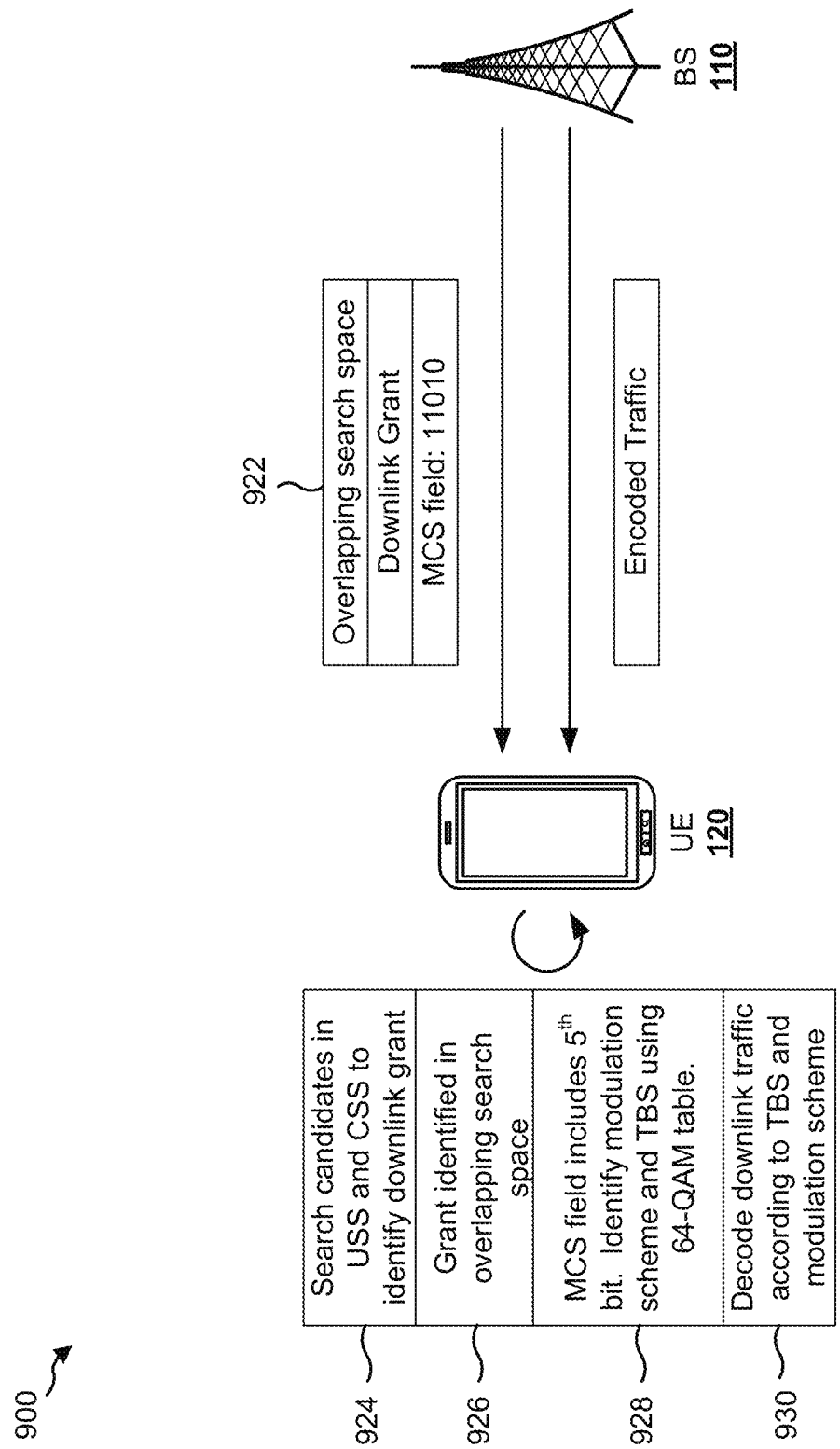
Figure 9D:
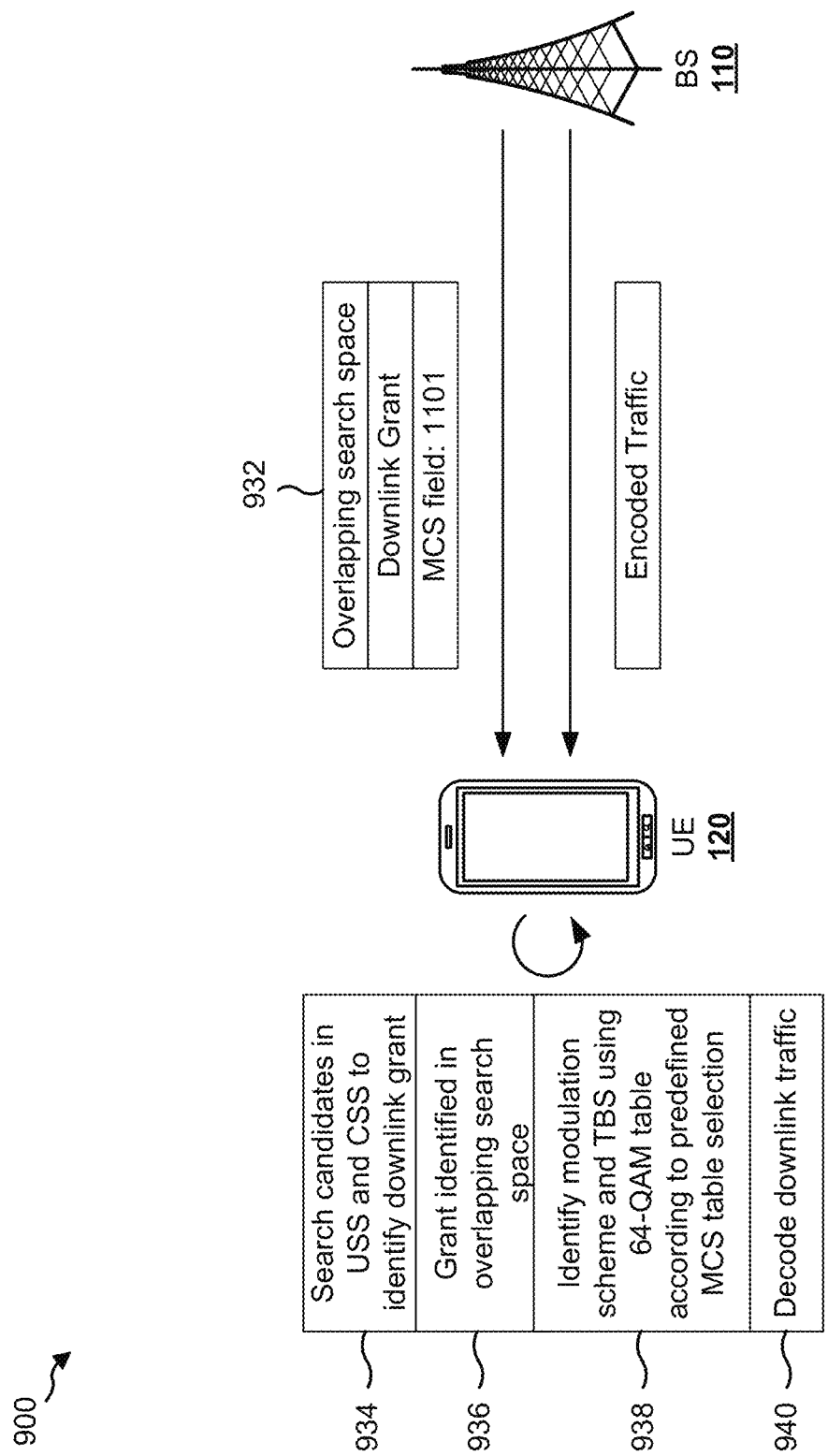

In some cases, the UE-specific search space and the common search space may overlap. In such a case, it may not be clear to which search space a grant belongs, so it may be difficult to determine which MCS table to use to determine a modulation scheme and TBS. FIGS. 9C and 9D show examples of how to determine which MCS table to use to select a modulation scheme and TBS when the grant is received in overlapping search space.

As shown in FIG. 9C, and by reference number 922, the BS 110 may provide a grant in an overlapping search space.

As further shown, the MCS field of the grant may include a fifth bit set to a zero value. In some aspects, the fifth bit may be a reserved bit, may be set to a padding value, may be set to one, and/or the like. The BS 110 may include the fifth bit in the MCS field to indicate whether the UE 120 is to use the MCS table associated with the higher modulation order or the lower modulation order to select the modulation order and/or TBS, as described in more detail below. In some aspects, the BS 110 may include the aforementioned bit in a field of the downlink grant other than the MCS field. Aspects described herein are equally applicable in such a case.

As shown by reference number 924, the UE 120 may search candidate grants in the UE-specific search space and the common search space to identify the downlink grant. As shown by reference number 926, the UE 120 may identify the grant in the overlapping search space.

As shown by reference number 928, since the grant is identified in the overlapping search space, the UE 120 may determine whether the grant includes the fifth bit to determine which MCS table to use. Here, the UE 120 determines to identify the modulation order and TBS using a 64-QAM MCS table based at least in part on the downlink grant including the fifth bit. For example, the UE 120 may use the 64-QAM MCS table (corresponding to the UE-specific search space) when the MCS field includes the fifth bit, and may use the 16-QAM MCS table when the MCS field does not include the fifth bit. Additionally, or alternatively, the UE 120 may use the 64-QAM MCS table when the fifth bit is set to a first value, and may use the 16-QAM table when the fifth bit is set to a second value. In this way, grants in the UE-specific search space and the common search space are differentiated using a particular bit, which provides differentiation of downlink grants for which a higher-order MCS table is to be used and grants for which a lower-order MCS table is to be used. As shown by reference number 930, the UE 120 may decode the downlink traffic according to the TBS and the modulation scheme.

As shown in FIG. 9D, and by reference number 932, the BS 110 may provide a downlink grant in an overlapping search space. As shown by reference number 934, the UE 120 may search candidate grants in the UE-specific search space and the common search space to identify the downlink grant. As shown by reference number 936, the UE 120 may identify the downlink grant in the overlapping search space.

As shown by reference number 938, the UE 120 may identify the modulation scheme and TBS based at least in part on a predefined MCS table selection. For example, the UE 120 may be preconfigured to use a particular MCS table (sometimes referred to herein as a preconfigured MCS table)(e.g., associated with a higher modulation order or a lower modulation order) when the downlink grant is included in an overlapping search space. Here, the UE 120 determines to use the 64-QAM table to select or identify the modulation scheme and TBS. In this way, the UE 120 identifies an MCS table based at least in part on a predefined MCS table selection, which conserves processor resources that would otherwise be used to evaluate the downlink grant to determine which MCS table and/or modulation scheme to use. As shown by reference number 940, the UE 120 may decode the downlink traffic based at least in part on the modulation scheme and TBS.

As indicated above, FIGS. 9A-9D are provided as examples. Other examples are possible and may differ from what was described with respect to FIGS. 9A-9D.

Figure 10:
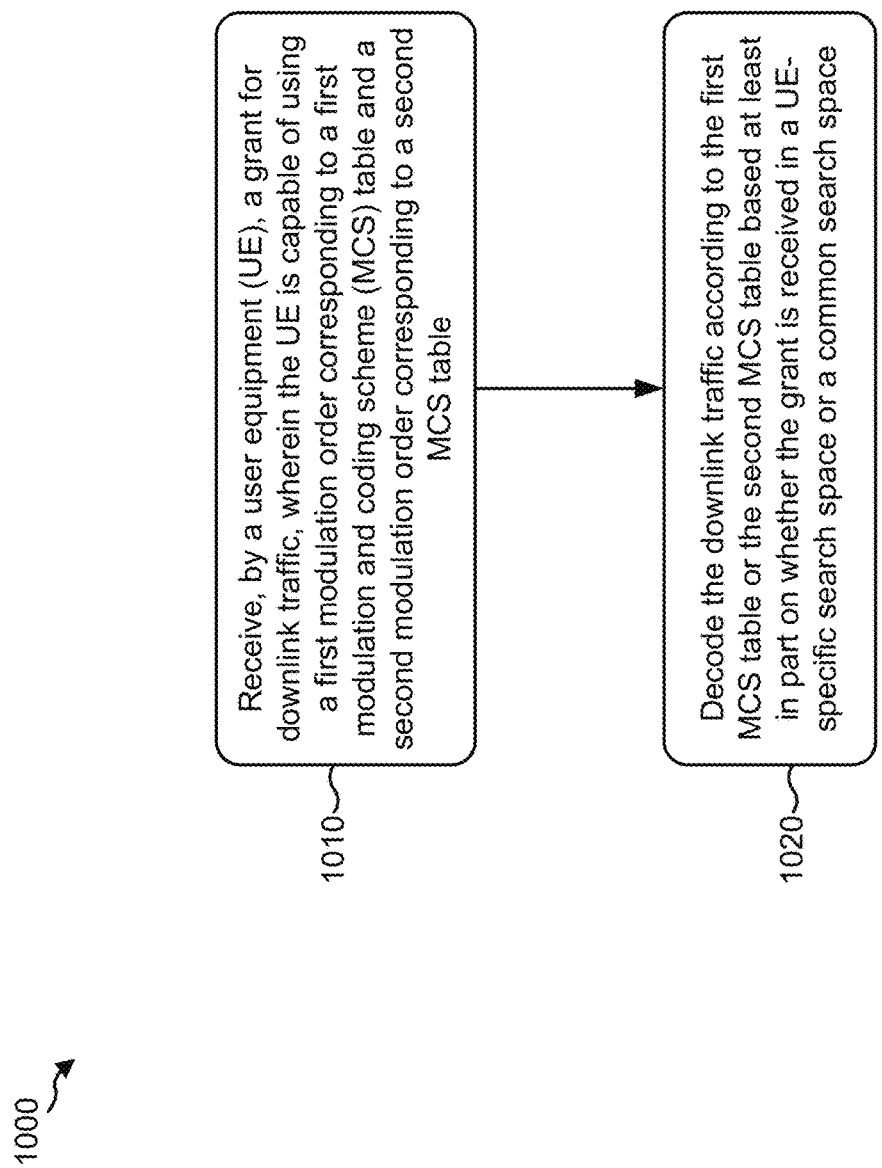
FIG. 10 is a flow chart of a method of wireless communication.

FIG. 10 is a flow chart of a method 1000 of wireless communication. The method may be performed by a UE (e.g., the UE 120 of FIG. 1, the apparatus 1502/1502', and/or the like). In some aspects, the method may be performed by a base station (e.g., the BS 110 and/or the like).

At 1010, the UE may receive a grant for downlink traffic, wherein the UE is capable of using a first modulation order corresponding to a first MCS table and a second modulation order corresponding to a second MCS table. For example, the UE 120 may receive a grant for downlink traffic. In some aspects, the grant may include DCI, such as DCI formatted based at least in part on DCI Format 6-A. The UE 120 may be capable of using a first modulation order corresponding to a first MCS table. For example, the first modulation order may be associated with a particular modulation scheme, such as 64-QAM and/or the like. The UE 120 may also be capable of using a second modulation order corresponding to a second MCS table, wherein the second modulation order is lower than the first modulation order. For example, the second modulation order may include 16-QAM, QPSK, and/or the like.

At 1020, the UE may decode the downlink traffic according to the first MCS table or the second MCS table based at least in part on whether the grant is received in a UE-specific search space or a common search space. For example, the UE 120 may decode the downlink traffic according to the first MCS table (e.g., may use the first MCS table to identify an appropriate modulation scheme) when the grant is received in a UE-specific search space, and may decode the downlink traffic according to the second MCS table when the grant is received in a common search space.

To decode the downlink traffic, the UE 120 may identify a particular MCS table to use to determine the modulation scheme and a TBS of the downlink traffic. For example, the UE 120 may identify an MCS table corresponding to the first modulation order (e.g., the first MCS table) when the grant is included in the UE-specific search space, or may identify an MCS table corresponding to the second modulation order (e.g., the second MCS table) when the grant is included in the common search space. The UE 120 may use an MCS field of the grant to identify an MCS of the MCS table, and may use a modulation scheme corresponding to the MCS, and a TBS corresponding to the MCS, to decode the traffic.

In some aspects, the grant is received in the UE-specific search space, and the UE is configured to decode the downlink traffic according to the first MCS table and based at least in part on a transport block size associated with the first MCS table. In some aspects, the grant is received in the common search space, and the UE is configured to decode the downlink traffic according to the second MCS table and based at least in part on a transport block size associated with the second MCS table.

In some aspects, the grant is received in an overlap between the common search space and the UE-specific search space. The UE may be configured to determine whether to decode the downlink traffic according to the first MCS table or the second MCS table based at least in part on whether an MCS field of the grant includes a particular bit, wherein the particular bit indicates whether the grant is associated with the common search space or the UE-specific search space.

In some aspects, the grant is received in an overlap between the common search space and the UE-specific search space. The UE may be configured to determine whether to decode the downlink traffic according to the first MCS table or the second MCS table based at least in part on a preconfigured modulation order of the first MCS table or the second MCS table.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

FIGS. 11A-11E are diagrams illustrating examples 1100 of selecting a modulation scheme and/or transport block size for decoding traffic based at least in part on a quantity of repetitions associated with the traffic. For example, in aspects described herein, multiple repetitions may not be permitted for higher-order (e.g., 64-QAM) downlink traffic. FIGS. 1A-11E describe approaches for handling grants of higher-order downlink traffic that indicate multiple repetitions. For example, the approaches in FIGS. 11A-11E may provide ways for the BS 110 to use the repetition number to signal information regarding particular modulation orders and/or TBSs to use.

Figure 11A:
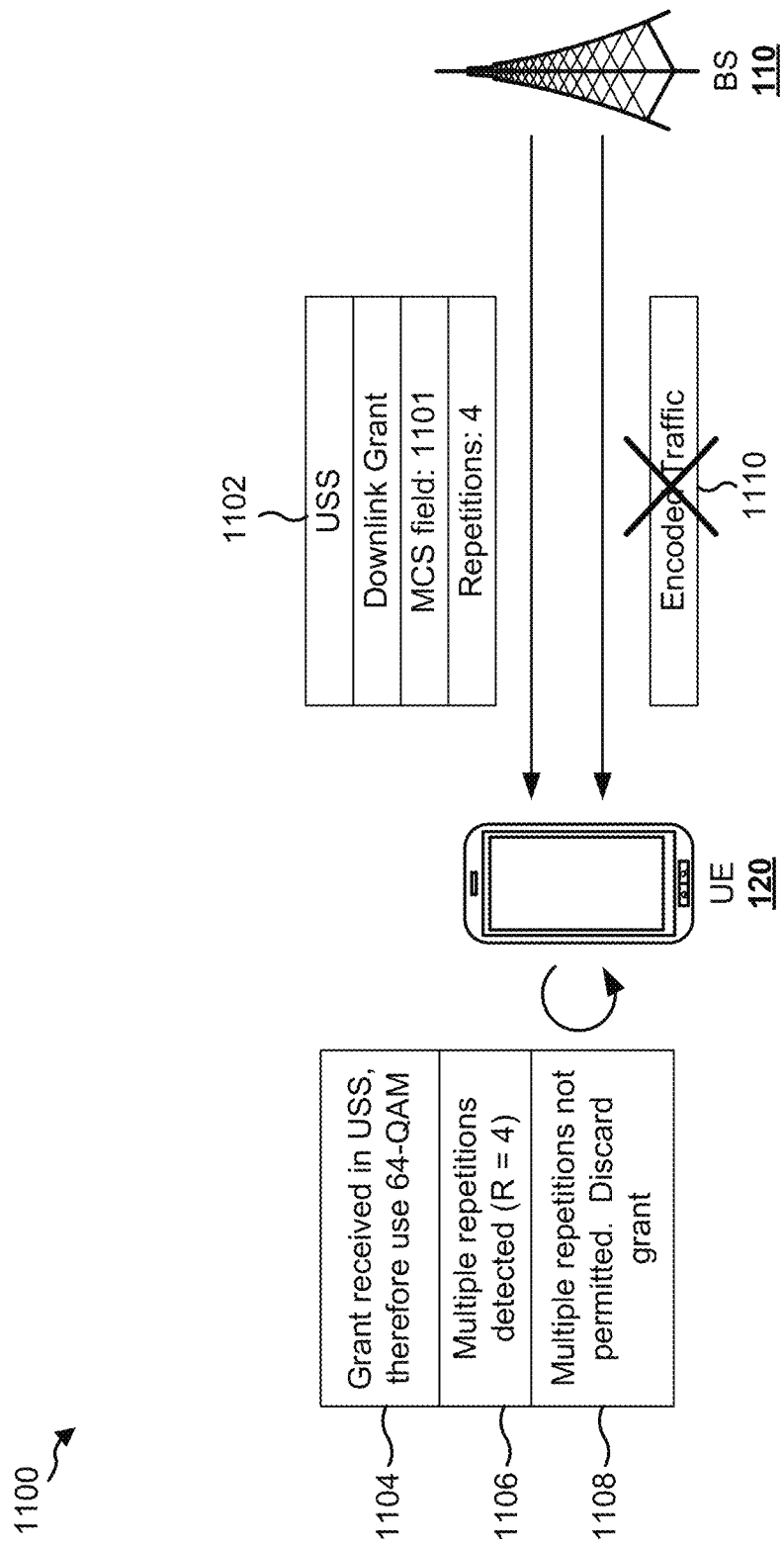
FIGS. 11A-11E are diagrams illustrating examples of selecting an MCS table and/or transport block size for decoding traffic based at least in part on a quantity of repetitions associated with the traffic.

As shown in FIG. 11A, and by reference number 1102, a BS 110 may provide a downlink grant to a UE 120 in a UE-specific search space. As described above, and as shown by reference number 1104, providing the downlink grant in the UE-specific search space may indicate that the UE 120 is to use a modulation scheme of a higher modulation order (e.g., 64-QAM) associated with a first MCS table, to decode the downlink grant. As shown by reference number 1106, the downlink grant identifies multiple repetitions of the downlink traffic. However, in aspects described herein, and as shown by reference number 1108, multiple repetitions are not supported or not permitted for 64-QAM downlink traffic. Therefore, in the aspect shown in FIG. 11A, the UE 120 discards the grant. As shown by reference number 1110, in such a case, the downlink traffic may not be decoded.

Figure 11B:
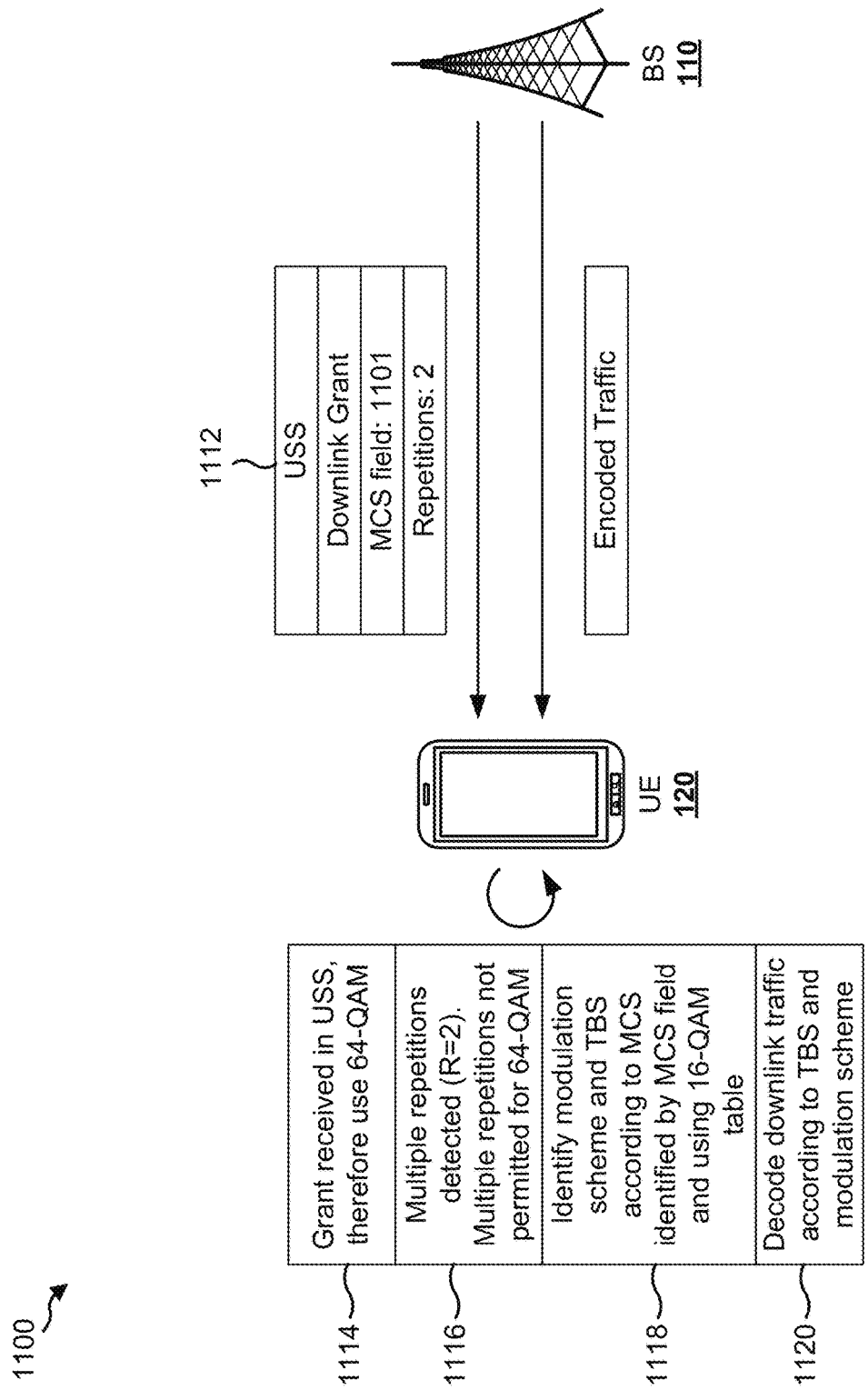

FIG. 11B shows an example of using an MCS table associated with a lower modulation order based at least in part on a downlink grant being associated with multiple repetitions. As shown in FIG. 11B, and by reference number 1112, the BS 110 may provide a downlink grant in a UE-specific search space. As shown by reference number 1114, the provision of the grant in the UE-specific search space may indicate that the UE 120 is to use 64-QAM to decode the corresponding downlink traffic. For example, the UE 120 may use an MCS table associated with 64-QAM to determine a modulation scheme and TBS of the downlink traffic.

However, as shown by reference number 1116, the downlink grant may identify multiple repetitions, which may not be permitted for 64-QAM. Therefore, as shown by reference number 1118, the UE 120 may use an MCS table associated with 16-QAM to identify a modulation scheme and a TBS for the downlink traffic. In this way, the UE 120 falls back to an MCS table associated with a lower modulation order when the repetition number identified by the downlink grant is incompatible with a modulation scheme of the higher modulation order. Further, since two repetitions are allocated, the UE 120 (and BS 110) may use the existing allocation to provide the downlink traffic at 16-QAM in a single repetition. Thus, complexity of the downlink transmission is reduced and reliability of the traffic is improved. As shown by reference number 1120, the UE 120 may decode the downlink traffic according to the identified TBS and modulation scheme.

Figure 11C:
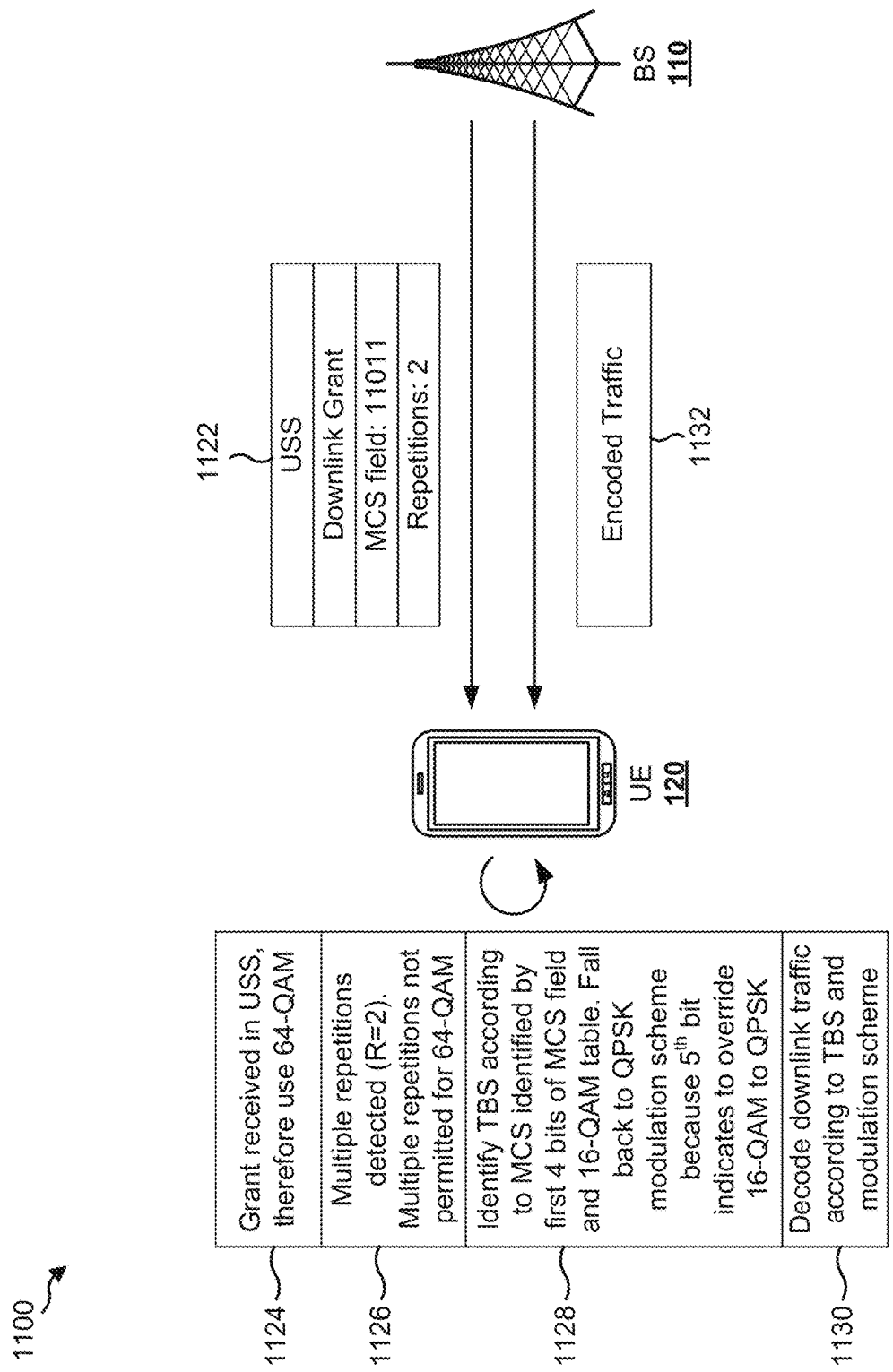

FIG. 11C shows an example of using an MCS table associated with a lowest modulation order, of three modulation orders, based at least in part on a bit value of an MCS field indicating a modulation order override.

As shown in FIG. 11C, and by reference number 1122, the BS 110 may provide a downlink grant in a UE-specific search space. As shown by reference number 1124, the provision of the grant in the UE-specific search space may indicate that the UE 120 is to use 64-QAM to decode the corresponding downlink traffic. For example, the UE 120 may use an MCS table associated with 64-QAM to determine a modulation scheme and TBS of the downlink traffic.

However, as shown by reference number 1126, the downlink grant may identify multiple repetitions, which may not be permitted for 64-QAM. Therefore, as shown by reference number 1128, the UE 120 may use an MCS table associated with 16-QAM to identify an MCS and TBS, and may fall back a 16-QAM modulation scheme identified by the 16-QAM table to a QPSK modulation scheme (e.g., with a modulation order of 4). The UE 120 may use the MCS table associated with QPSK because the MCS field includes a fifth bit in addition to four bits used to identify the MCS using an MCS table associated with 16-QAM. For example, the MCS table associated with QPSK may be implemented by changing the modulation scheme indicated by a 16-QAM table to QPSK. Here, for example, the MCS field includes four bits (e.g., 1101) that may be used to identify an MCS using a corresponding MCS table. Since the downlink grant identifies multiple repetitions, which is not permitted for 64-QAM traffic, the UE 120 may first determine to use a 16-QAM table. Second, since the MCS field includes a fifth bit that is set to a particular value (e.g., 1), the UE 120 may determine to fall back to a QPSK MCS table. Additionally, or alternatively, the UE 120 may identify a TBS according to the 16-QAM table, and may fall back from a 16-QAM modulation scheme identified by the 16-QAM table to a QPSK modulation scheme.

In this way, the UE 120 determines modulation scheme and TBS according to a lower-order MCS table based at least in part on a grant associated with a higher-order MCS table. This reduces a quantity of different DCI formats and/or modulation scheme indications to be implemented and improves versatility of the downlink scheduling process. As shown by reference number 1130, the UE 120 may decode the downlink traffic (shown by reference number 1132) according to the identified TBS and modulation scheme.

Figure 11D:
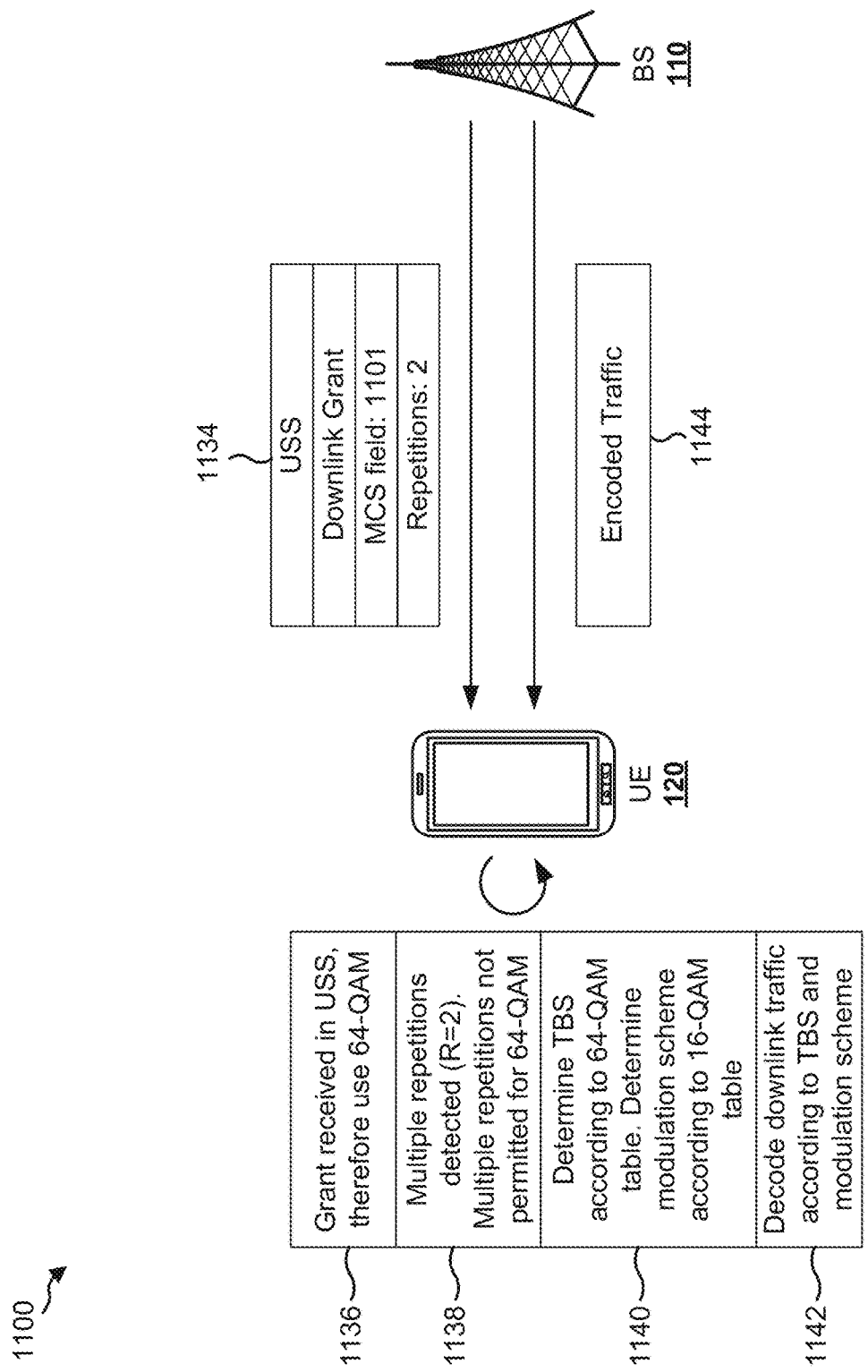

FIG. 11D shows an example of determining a modulation scheme according to a first MCS table and determining a TBS according to a second MCS table based at least in part on receiving a grant that identifies multiple repetitions. As shown in FIG. 11D, and by reference number 1134, the BS 110 may provide a downlink grant in a UE-specific search space. As shown by reference number 1136, the provision of the grant in the UE-specific search space may indicate that the UE 120 is to use 64-QAM to decode the corresponding downlink traffic. For example, the UE 120 may use an MCS table associated with 64-QAM to determine a modulation scheme and TBS of the downlink traffic.

However, as shown by reference number 1138, the downlink grant may identify multiple repetitions, which may not be permitted for 64-QAM. Therefore, as shown by reference number 1140, the UE 120 may use an MCS table associated with 64-QAM to identify the TBS, and may use an MCS table associated with 16-QAM to determine a modulation scheme. In some aspects, it may be advantageous to use a larger TBS from an MCS table associated with a higher modulation order in combination with a modulation scheme obtained from an MCS table associated with a lower modulation order. For example, the larger TBS may permit transmission of larger payloads, and the lower modulation scheme may improve robustness of the larger payloads. In this way, the BS 110 can signal to use a larger TBS and a lower modulation scheme by indicating multiple repetitions of downlink traffic. As shown by reference number 1142, the UE 120 may decode the downlink traffic (shown by reference number 1144) according to the TBS and the modulation scheme.

In some aspects, the UE 120 may determine whether to switch from a higher modulation order (or an MCS table associated with the higher modulation order) to a lower modulation order (or an MCS table associated with the lower modulation order) based at least in part on a value of the higher modulation order. As one example, the UE 120 may switch from 64-QAM to 16-QAM when the higher modulation order is 64-QAM, may remain at 16-QAM when the higher modulation order is 16-QAM, and may remain at QPSK when the higher modulation order is QPSK. As another example, the UE 120 may switch from 64-QAM to 16-QAM when the higher modulation order is 64-QAM, may switch from 16-QAM to QPSK when the higher modulation order is 16-QAM, and may remain at QPSK when the higher modulation order is QPSK.

Figure 11E:
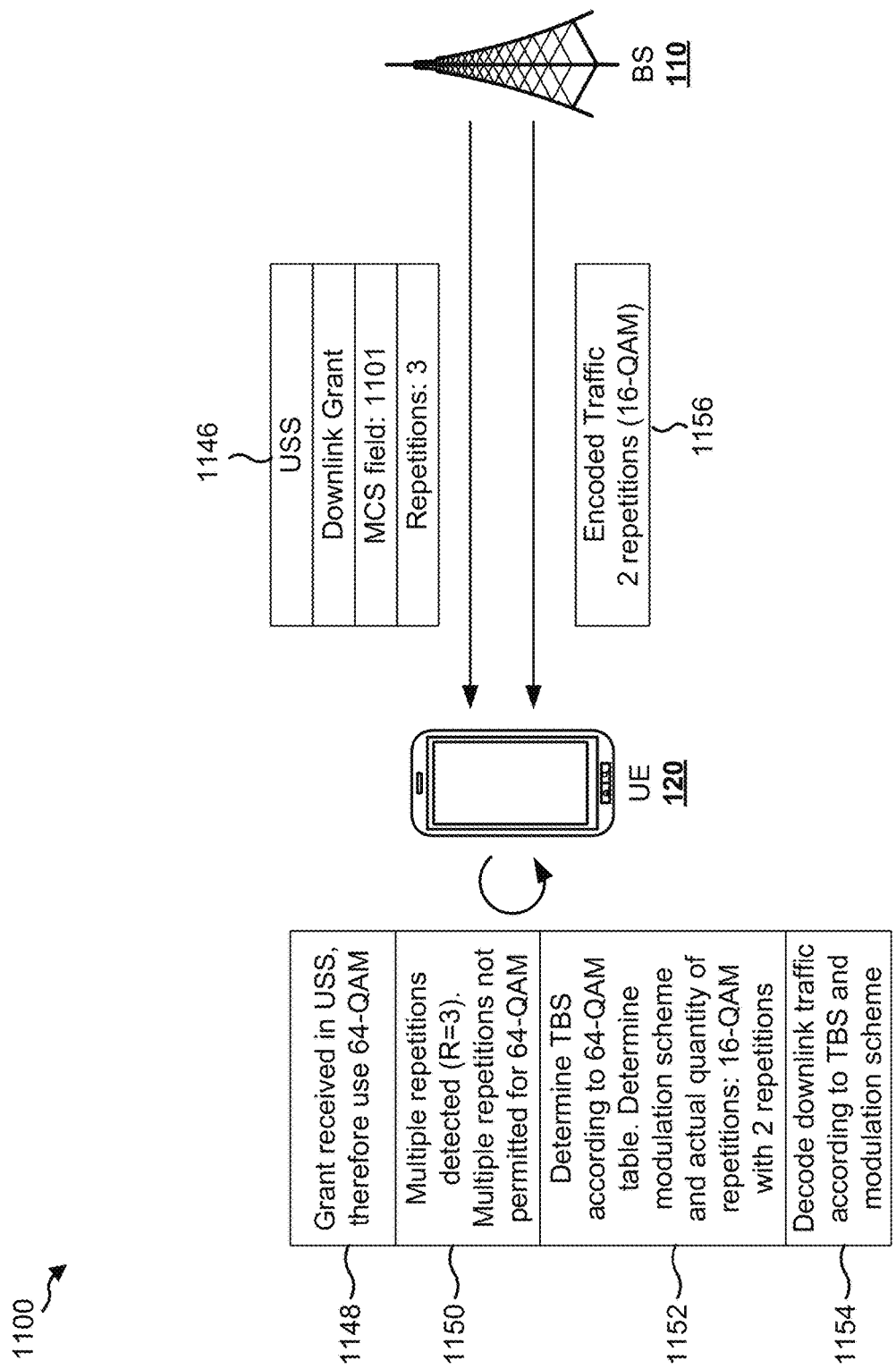

FIG. 11E is an example of selecting a modulation scheme and/or an actual number of repetitions based at least in part on an indicated number of repetitions. As shown in FIG. 11E, and by reference number 1146, the BS 110 may provide a downlink grant in a UE-specific search space. As shown by reference number 1148, the provision of the grant in the UE-specific search space may indicate that the UE 120 is to use 64-QAM to decode the corresponding downlink traffic.

However, as shown by reference number 1150, the downlink grant may identify multiple repetitions (e.g., 3 repetitions), which may not be permitted for 64-QAM. Therefore, as shown by reference number 1152, the UE 120 may determine the TBS according to the 64-QAM table, and may determine a modulation scheme and an actual quantity of repetitions based at least in part on the indicated quantity of repetitions. Here, since the indicated quantity of repetitions is 3, the UE 120 identifies a modulation scheme of 16-QAM and 2 actual repetitions. By using the TBS associated with the higher modulation order (e.g., 64-QAM) and the lower modulation scheme, versatility of scheduling is improved. As shown by reference number 1154, the UE 120 may decode the downlink traffic (shown by reference number 1156) according to the TBS and the modulation scheme.

In some aspects, when one repetition is indicated (R=1), the UE 120 may use 64-QAM with no repetitions. In some aspects, when two repetitions is indicated (R=2), the UE 120 may use 16-QAM with no repetitions. In some aspects, when three repetitions are indicated (R=3), the UE 120 may use 16-QAM with three repetitions. In some aspects, when four repetitions are indicated (R=4), the UE 120 may use QPSK with a single repetition.

As indicated above, FIGS. 11A-11E are provided as examples. Other examples are possible and may differ from what was described with respect to FIGS. 11A-11E.

Figure 12:
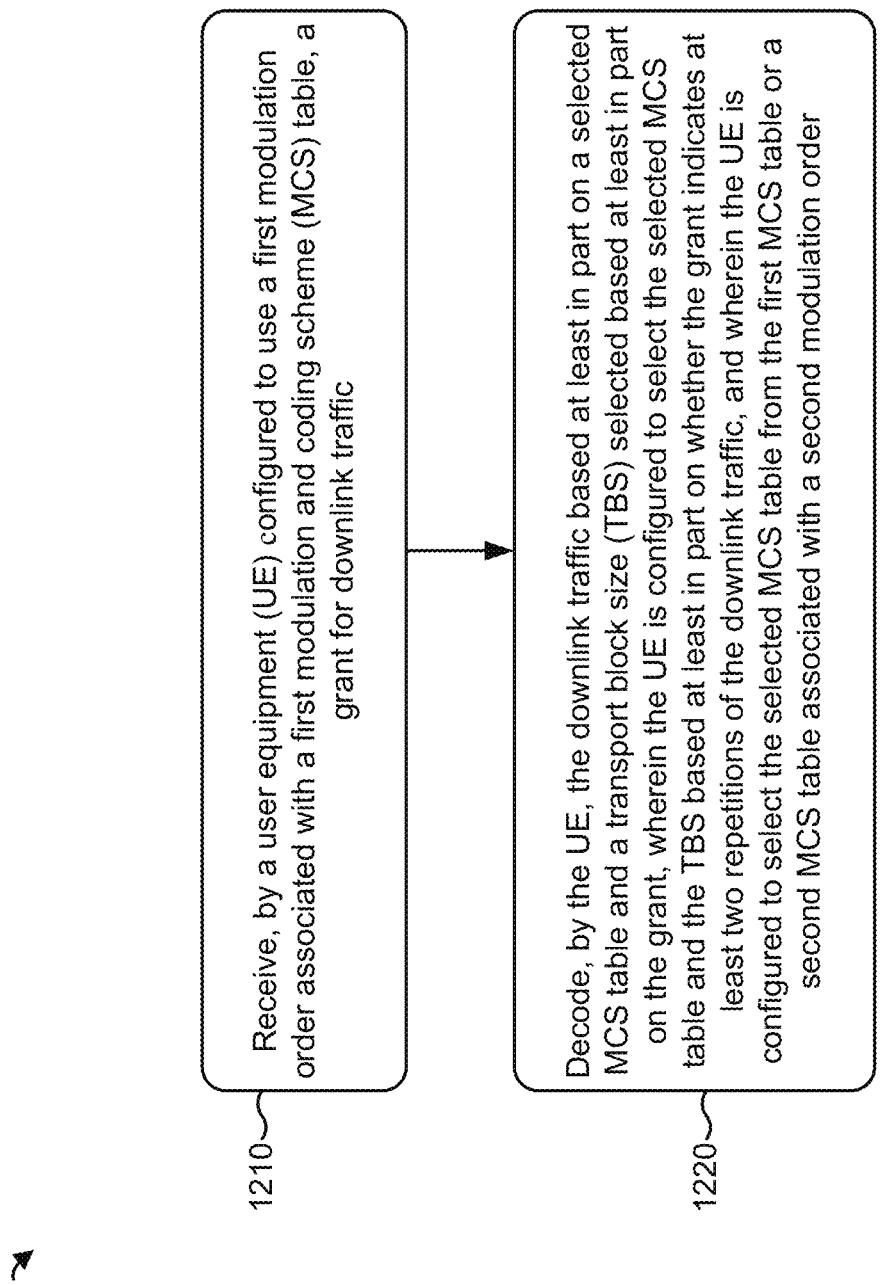
FIG. 12 is a flow chart of a method of wireless communication.

FIG. 12 is a flow chart of a method 1200 of wireless communication. The method may be performed by a UE (e.g., the UE 120 of FIG. 1, the apparatus 1502/1502', and/or the like). In some aspects, the method may be performed by a base station (e.g., the BS 110 and/or the like).

At 1210, the UE may receive a grant for downlink traffic. For example, the UE may be configured to use a first modulation order associated with the first MCS. The grant may include an MCS field identifying an MCS, and may identify a number of repetitions of the downlink traffic.

At 1220, the UE may decode the downlink traffic based at least in part on a selected MCS table and a TBS selected based at least in part on the grant, wherein the UE is configured to select the selected MCS table and the TBS based at least in part on whether the grant indicates at least two repetitions of the downlink traffic, and wherein the UE is configured to select the selected MCS table from the first MCS table or a second MCS table associated with a second modulation order. For example, the UE may determine a modulation scheme and a TBS based at least in part on the grant. The UE may select the modulation scheme and/or the TBS from one or more MCS tables based at least in part on whether the grant identifies at least two repetitions, an identified number of repetitions, and/or the like. In some aspects, the UE may determine which MCS table to use based at least in part on the grant, as described in more detail above.

In some aspects, the selected MCS table and the TBS correspond to the second MCS table based at least in part on the grant indicating the at least two repetitions of the downlink traffic. In some aspects, an MCS field of the grant has a particular quantity of bits, wherein the UE is configured to use fewer than all of the particular quantity of bits to identify a modulation scheme. In some aspects, the UE is configured to use a first subset of the particular quantity of bits to identify a modulation scheme, and the UE is configured to use a second subset of the particular quantity of bits to determine whether to override the selected MCS table. In some aspects, the TBS corresponds to the first MCS table and the selected MCS table corresponds to the second MCS table based at least in part on the grant indicating the at least two repetitions of the downlink traffic. In some aspects, the UE is configured to select the selected MCS table based at least in part on a quantity of repetitions of the at least two repetitions indicated in the grant.

Although FIG. 12 shows example blocks of a method of wireless communication, in some aspects, the method may include additional blocks, fewer blocks, different blocks, or differently arranged blocks than those shown in FIG. 12. Additionally. or alternatively, two or more blocks shown in FIG. 12 may be performed in parallel.

Figure 13:
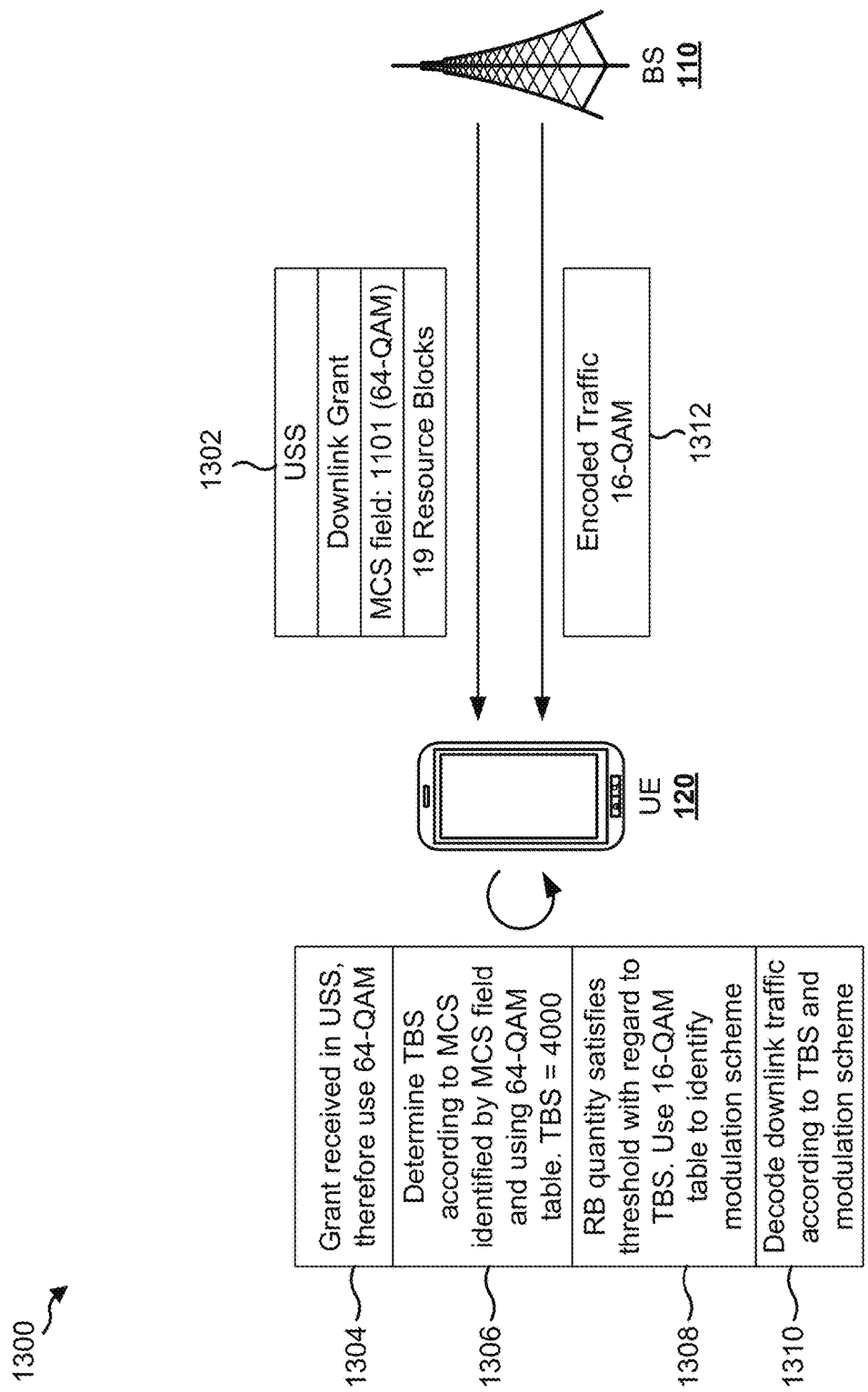
FIG. 13 is a diagram illustrating an example of selecting an MCS table for decoding traffic based at least in part on a resource allocation associated with the traffic.

FIG. 13 is a diagram illustrating an example 1300 of selecting a modulation scheme for decoding traffic based at least in part on a resource allocation associated with the traffic. For some resource allocations, and/or for UEs 120 with a limited soft buffer, it may be sub-optimal to use 64-QAM (or another higher modulation order). FIG. 13 describes a process for adjusting modulation scheme based at least in part on a resource allocation, while using a TBS associated with 64-QAM (or another higher modulation order) to improve downlink performance without exhausting the buffer of the UE 120.

As shown in FIG. 13, and by reference number 1302, a BS 110 may provide a downlink grant in a UE-specific search space to a UE 120. As further shown, the downlink grant may identify an allocation of 19 RBs. As shown by reference number 1304, the provision of the grant in the UE-specific search space may indicate that the UE 120 is to use 64-QAM to decode the corresponding downlink traffic. As shown by reference number 1306, the UE 120 may determine a TBS for the downlink traffic (e.g., 4000 according to a 64-QAM table and according to an MCS identified by an MCS field of the downlink grant). By using the TBS associated with the larger modulation order and/or the 64-QAM table, the UE 120 may increase versatility of the TBS and/or decrease crowding of a shared channel or PDSCH of the UE 120.

As shown by reference number 1308, the UE 120 may determine that a quantity of the RBs (e.g., 19 RBs) satisfies a threshold with regard to the TBS, and may therefore use a 16-QAM table to identify a modulation scheme. For example, the UE 120 may store information identifying TBSs and corresponding thresholds, and may determine that the RB number of 19 satisfies a corresponding threshold associated with the TBS of 4000. Accordingly, the UE 120 may use the 16-QAM table to determine the modulation scheme, or may use 16-QAM as the modulation scheme. In this way, the UE 120 determines when to use an MCS table associated with a lower modulation order based at least in part on a number of RBs allocated for the UE 120, which reduces a likelihood of a soft buffer of the UE 120 being insufficient for the modulation scheme. Thus, a likelihood of dropped or repetitious traffic is reduced. As shown by reference number 1310, the UE 120 may decode the downlink traffic (shown by reference number 1312) according to the TBS and the modulation scheme.

As indicated above, FIG. 13 is provided as an example. Other examples are possible and may differ from what was described with respect to FIG. 13.

Figure 14:
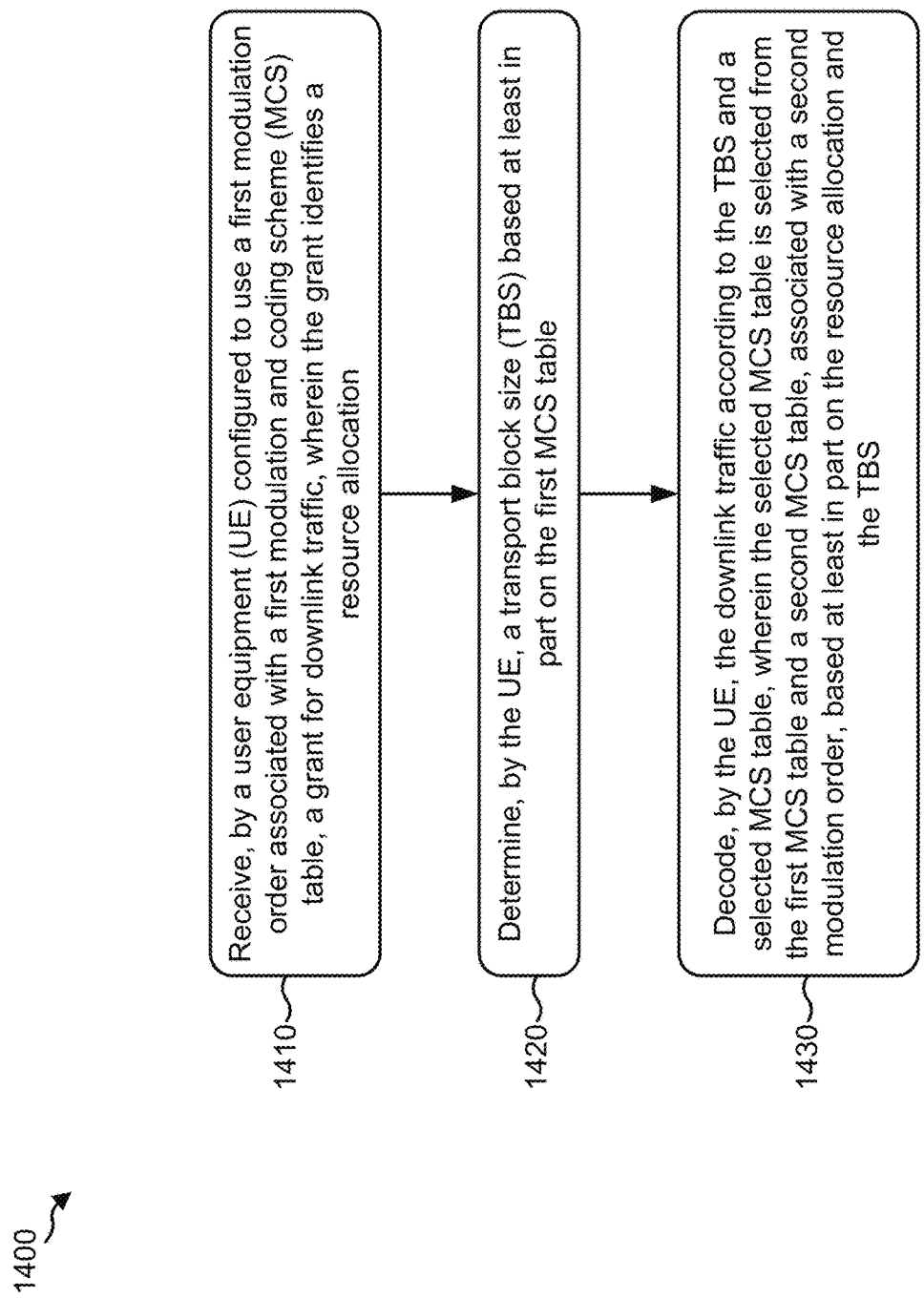
FIG. 14 is a flow chart of a method of wireless communication.

FIG. 14 is a flow chart of a method 1400 of wireless communication. The method may be performed by a UE (e.g., the UE 120 of FIG. 1, the apparatus 1502/1502', and/or the like). In some aspects, the method may be performed by a base station (e.g., the BS 110 and/or the like).

At 1410, the UE may receive a grant for downlink traffic, wherein the grant identifies a resource allocation. For example, the UE may be configured to use a first modulation order associated with a first MCS table. The UE may receive a grant that identifies a resource allocation (e.g., a number of RBs). In some aspects, the grant may include an MCS field that identifies an MCS of the downlink grant.

At 1420, the UE may determine a TBS based at least in part on the first MCS table. For example, the UE may use the MCS identified by the MCS field to determine a TBS of the grant.

At 1430, the UE may decode the downlink traffic according to the TBS and a selected MCS table, wherein the selected MCS table is selected from the first MCS table and a second MCS table, associated with a second modulation order, based at least in part on the resource allocation and the TBS. The UE may decode the downlink traffic according to the TBS. Further, the UE may decode the downlink traffic based at least in part on an MCS table that is selected from two or more MCS tables based at least in part on the resource allocation.

In some aspects, the second MCS table is selected based at least in part on the resource allocation satisfying a threshold with regard to the TBS. In some aspects, the UE is a machine type communication UE. In some aspects, the TBS corresponds to the first MCS table and the selected MCS table corresponds to the second MCS table based at least in part on the resource allocation and the TBS. In some aspects, the first modulation order is a first maximum modulation order and the second modulation order is related to a second maximum modulation order, the first maximum modulation order being lower than the second maximum modulation order.

Although FIG. 14 shows example blocks of a method of wireless communication, in some aspects, the method may include additional blocks, fewer blocks, different blocks, or differently arranged blocks than those shown in FIG. 14. Additionally, or alternatively, two or more blocks shown in FIG. 14 may be performed in parallel.

Figure 15:
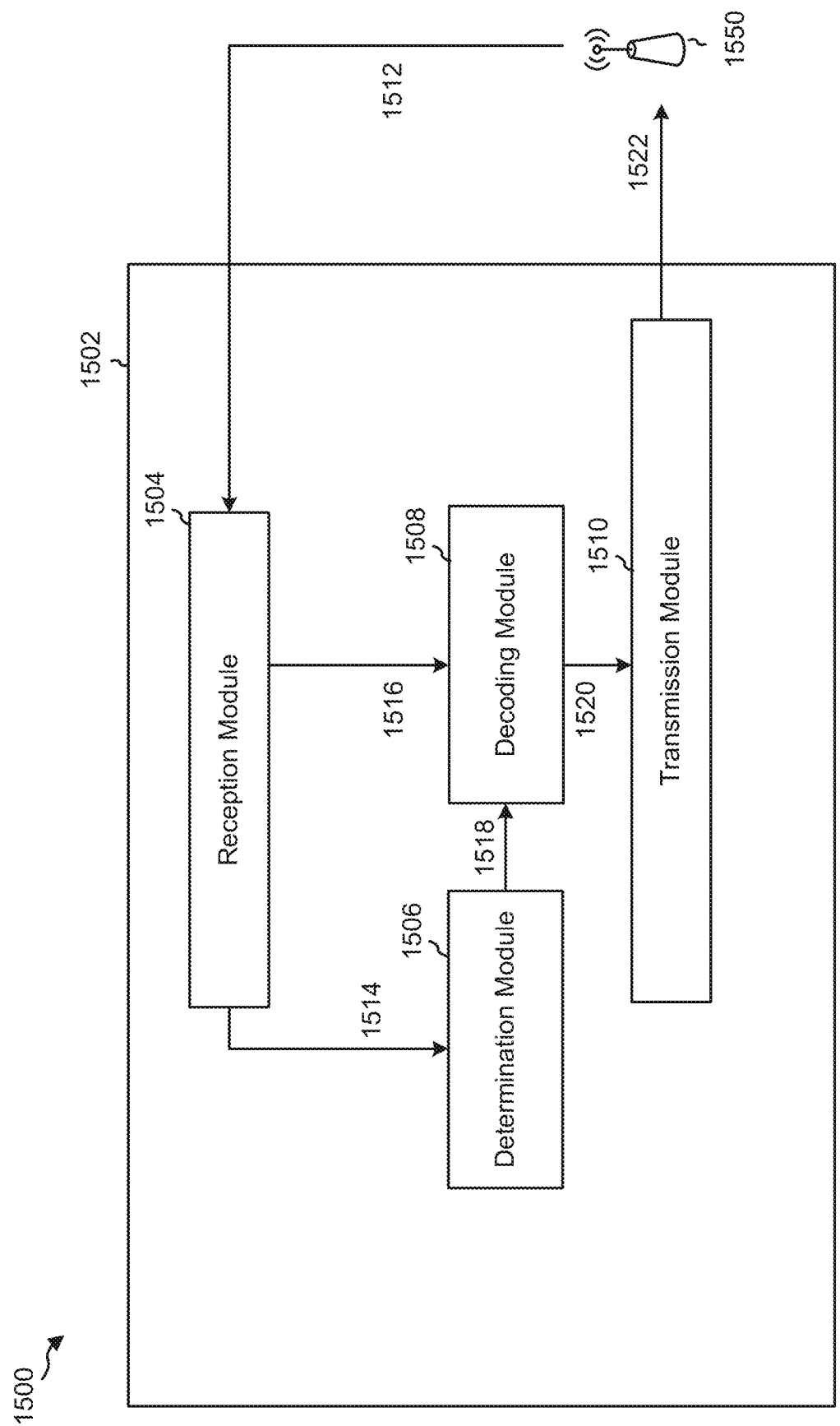
FIG. 15 is a conceptual data flow diagram illustrating the data flow between different modules/means/components in an example apparatus.

FIG. 15 is a conceptual data flow diagram 1500 illustrating the data flow between different modules/means/components in an example apparatus 1502. The apparatus 1502 may be a UE (e.g., the UE 120). In some aspects, the apparatus 1502 may be an eNB (e.g., the BS 110). In some aspects, the apparatus 1502 includes a reception module 1504, a determination module 1506, a decoding module 1508, and/or a transmission module 1510.

The reception module 1504 may receive signals 1512 from a wireless communication device 1550 (e.g., a BS 110 and/or the like). The signals 1512 may include downlink traffic and/or a grant for downlink traffic. The reception module 1504 may process the signals 1512, and may provide data 1514 to the determination module 1506 based at least in part on the signals 1512. Additionally, or alternatively, the reception module may provide data 1516 to the decoding module 1508 based at least in part on the signals 1512. The data 1514 and/or the data 1516 may identify the downlink grant and/or information included in the downlink grant. In some aspects, the data 1516 may include the downlink traffic.

The determination module 1506 may determine a TBS based at least in part on one or more MCS tables. For example, the UE 120 may store information identifying the one or more MCS tables, and the determination module may determine the TBS using the one or more MCS tables. In some aspects, the determination module may determine additional or different information based at least in part on the one or more MCS tables, such as a modulation order and/or the like. In some aspects, the determination module 1506 may determine whether a grant is valid based at least in part on a resource reference size, a number of repetitions, or a modulation configuration of the apparatus 1502/1502'. Additionally, or alternatively, the determination module 1506 may determine CSI feedback based at least in part on a CQI table and a CSI reference resource size. The determination module 1506 may provide data 1518 to the decoding module 1508. The data 1518 may identify the TBS and/or the additional or different information. The decoding module 1508 may decode the downlink traffic based at least in part on the data 1516 and/or the data 1518. In some aspects, the decoding module 1508 may provide data 1520 to the transmission module 1510. The data 1520 may include, for example, ACK/NACKs for the downlink traffic, CSI feedback, and/or the like. The transmission module 1510 may transmit signals 1522 to the wireless communication device 1550 based at least in part on the data 1520.

The apparatus may include additional modules that perform each of the blocks of the algorithm in the aforementioned flow chart of FIGS. 10, 12, and/or 14. As such, each block in the aforementioned flow chart of FIGS. 10, 12, and/or 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 15 are provided as an example. In practice, there may be additional modules, fewer modules, different modules, or differently arranged modules than those shown in FIG. 15. Furthermore, two or more modules shown in FIG. 15 may be implemented within a single module, or a single module shown in FIG. 15 may be implemented as multiple, distributed modules. Additionally, or alternatively, a set of modules (e.g., one or more modules) shown in FIG. 15 may perform one or more functions described as being performed by another set of modules shown in FIG. 15.

Figure 16:
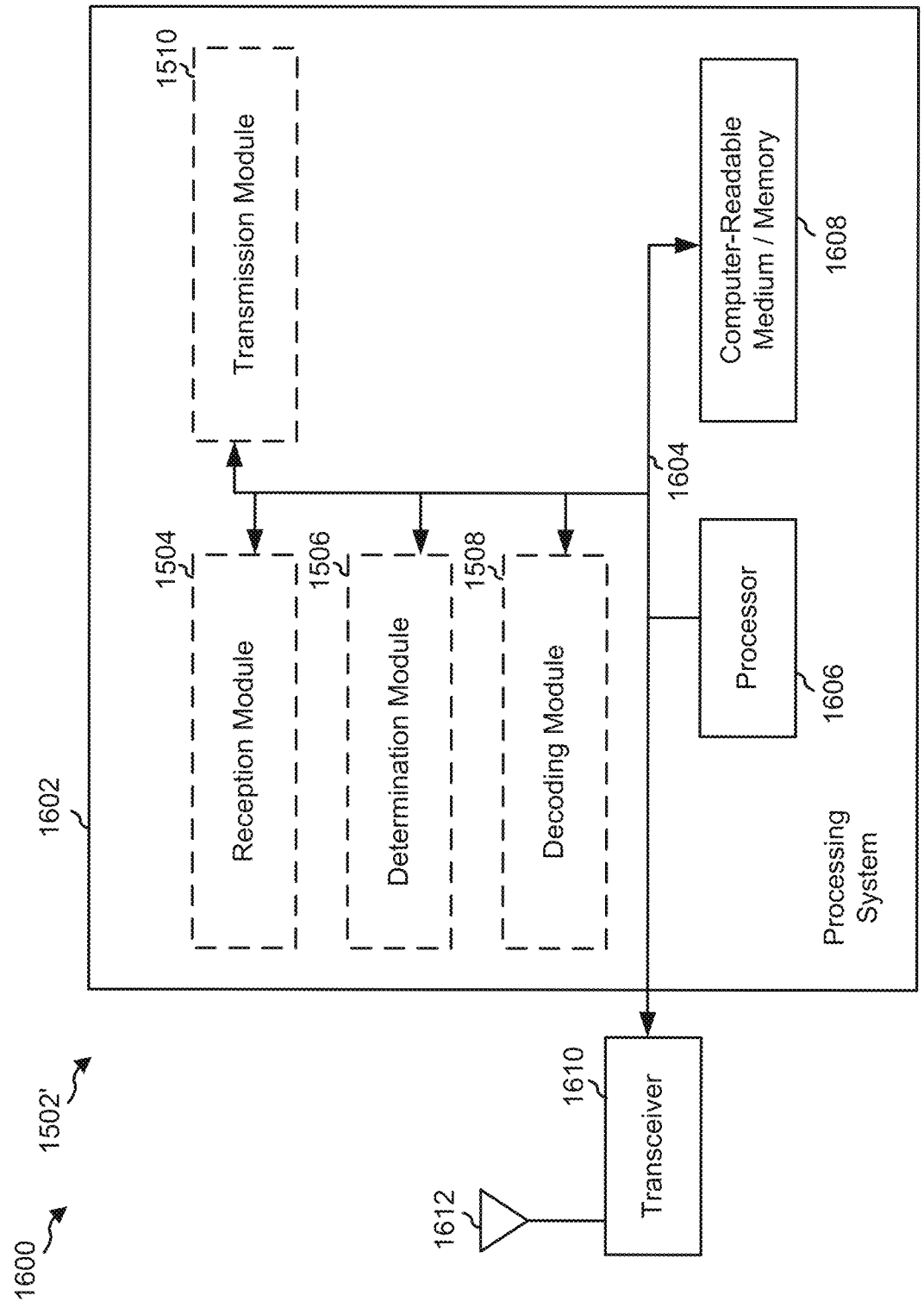
FIG. 16 is a diagram illustrating an example of a hardware implementation for an apparatus employing a processing system.

FIG. 16 is a diagram 1600 illustrating an example of a hardware implementation for an apparatus 1502' employing a processing system 1602. The apparatus 1502' may be a UE (e.g., the UE 120). In some aspects, the apparatus 1502' may be an eNB (e.g., the BS 110).

The processing system 1602 may be implemented with a bus architecture, represented generally by the bus 1604. The bus 1604 may include any number of interconnecting buses and bridges depending on the specific application of the processing system 1602 and the overall design constraints. The bus 1604 links together various circuits including one or more processors and/or hardware modules, represented by the processor 1606, the modules 1504, 1506, 1508, 1510, and the computer-readable medium/memory 1608. The bus 1604 may also link various other circuits such as timing sources, peripherals, voltage regulators, and power management circuits, which are well known in the art, and therefore, will not be described any further.

The processing system 1602 may be coupled to a transceiver 1610. The transceiver 1610 is coupled to one or more antennas 1612. The transceiver 1610 provides a means for communicating with various other apparatus over a transmission medium. The transceiver 1610 receives a signal from the one or more antennas 1612, extracts information from the received signal, and provides the extracted information to the processing system 1602, specifically the reception module 1504. In addition, the transceiver 1610 receives information from the processing system 1602, specifically the transmission module 1510, and based at least in part on the received information, generates a signal to be applied to the one or more antennas 1612. The processing system 1602 includes a processor 1606 coupled to a computer-readable medium/memory 1608. The processor 1606 is responsible for general processing, including the execution of software stored on the computer-readable medium/memory 1608. The software, when executed by the processor 1606, causes the processing system 1602 to perform the various functions described supra for any particular apparatus. The computer-readable medium/memory 1608 may also be used for storing data that is manipulated by the processor 1606 when executing software. The processing system further includes at least one of the modules 1504, 1506, 1508, and 1510. The modules may be software modules running in the processor 1606, resident/stored in the computer readable medium/memory 1608, one or more hardware modules coupled to the processor 1606, or some combination thereof. The processing system 1602 may be a component of the UE 120 and may include the memory 282 and/or at least one of the TX MIMO processor 266, the RX processor 258, and/or the controller/processor 280. In some aspects, the processing system 1602 may be a component of the BS 110 and may include the memory 242 and/or at least one of the TX MIMO processor 230, the receive processor 238, and/or the controller/processor 240.

In some aspects, the apparatus 1502/1502' for wireless communication includes means for receiving a grant for downlink traffic; means for decoding the downlink traffic according to a first MCS table or a second MCS table based at least in part on whether the grant is received in a UE-specific search space or a common search space; means for decoding the downlink traffic based at least in part on a selected MCS table and a TBS selected based at least in part on the grant, wherein the apparatus 1502/1502' is configured to select the selected MCS table and the TBS based at least in part on whether the grant indicates at least two repetitions of the downlink traffic; means for determining a TBS based at least in part on a first MCS; means for decoding downlink traffic according to the TBS and a selected MCS table, wherein the selected MCS table is selected from a first MCS table and a second MCS table, associated with a second modulation order, based at least in part on the resource allocation and the TBS; means for receiving a grant identifying a number of repetitions; means for determining whether the grant is valid based at least in part on at least one of the number of repetitions, a CSI reference resource size, or a modulation configuration of the apparatus 1502/1502'; means for determining CSI feedback based at least in part on a CQI table and a configured CSI reference resource size of the apparatus 1502/1502'; and means for reporting the CSI feedback. The aforementioned means may be one or more of the aforementioned modules of the apparatus 1502 and/or the processing system 1602 of the apparatus 1502' configured to perform the functions recited by the aforementioned means. As described supra, the processing system 1602 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

In some aspects, the apparatus 1502/1502' for wireless communication includes the aforementioned means. The aforementioned means may be one or more of the aforementioned modules of the apparatus 1502 and/or the processing system 1602 of the apparatus 1502' configured to perform the functions recited by the aforementioned means. As described supra, the processing system 1602 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 16 is provided as an example. Other examples are possible and may differ from what was described in connection with FIG. 16.

Figure 17A:
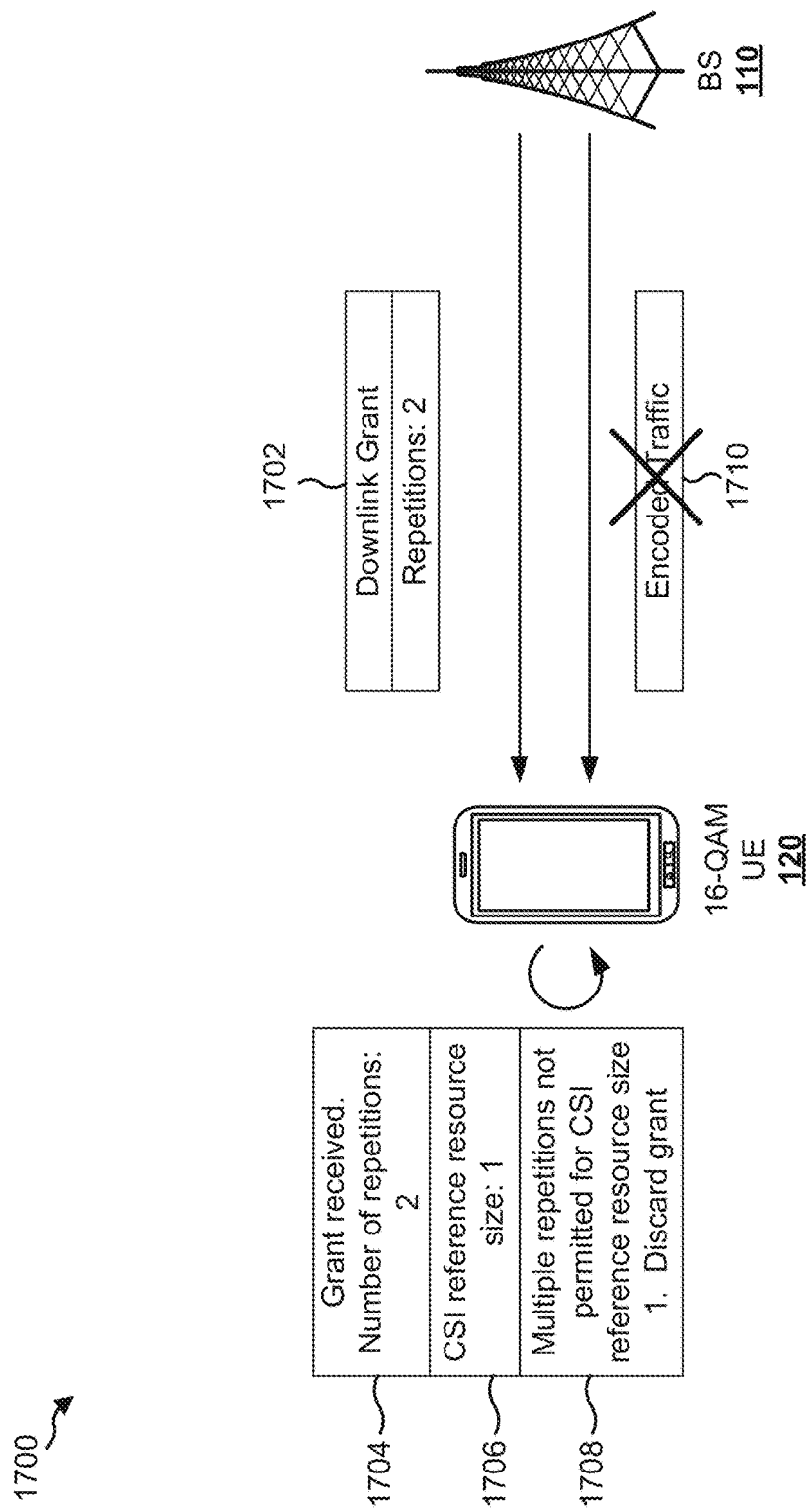
FIGS. 17A and 17B are diagrams illustrating examples of selectively discarding a grant for downlink traffic based at least in part on at least one of a number of repetitions, a channel state information (CSI) reference resource size, or a modulation configuration.
Figure 17B:
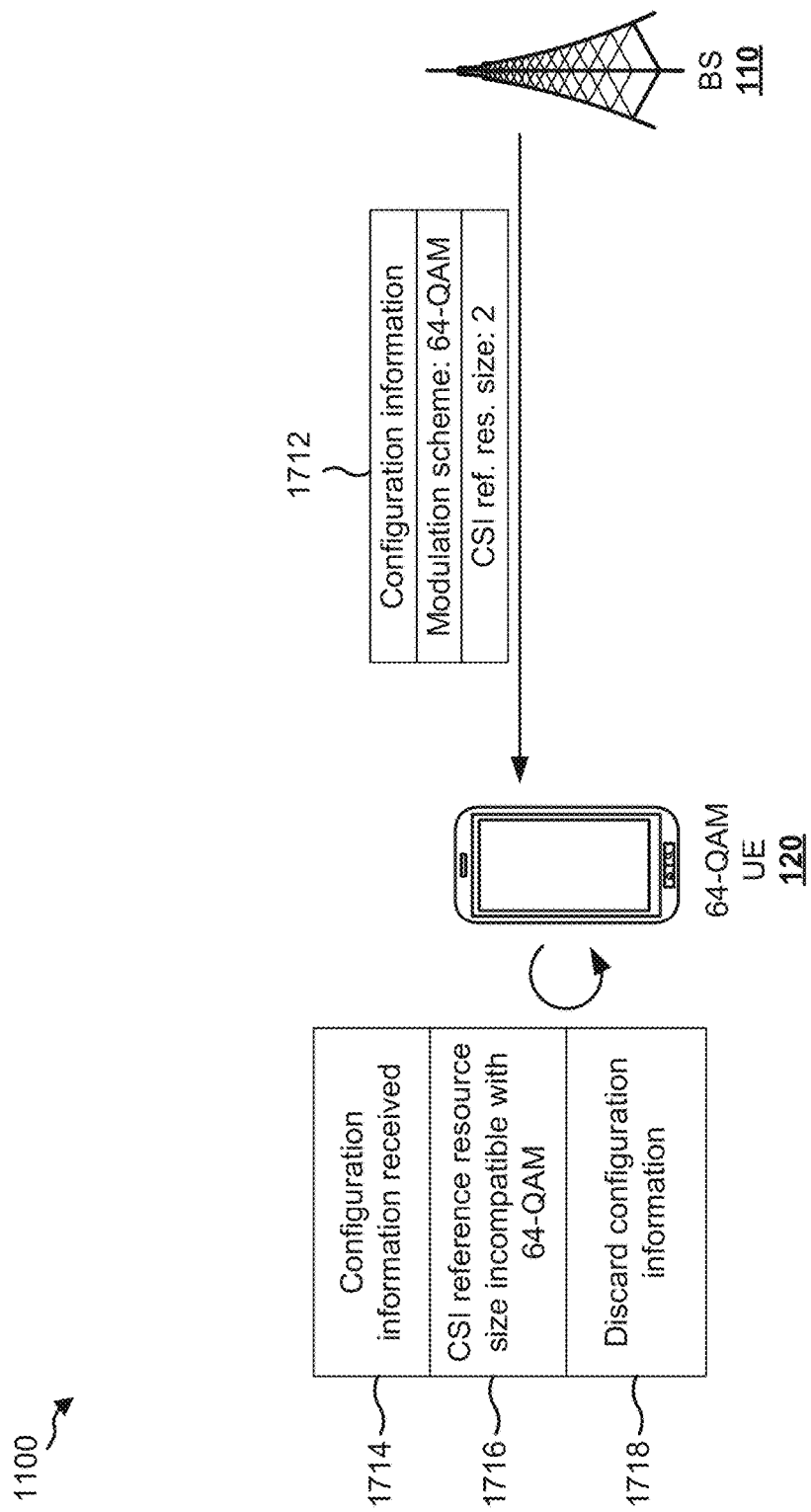

FIGS. 17A and 17B are diagrams illustrating examples 1700 of selectively discarding a grant for downlink traffic based at least in part on a CSI reference resource size.

For the purpose of FIG. 17A, assume that a UE 120 has been configured to use 16-QAM (e.g., based at least in part on RRC signaling and/or the like). In other words, assume that the UE 120 has been configured to use an MCS table associated with 16-QAM to determine information for demodulating downlink traffic. For example, a UE20 configured to demodulate downlink traffic using a 64-QAM MCS table may be capable of demodulating 16-QAM traffic with multiple repetitions and a CSI reference resource size of 1. However, the UE 120 shown in FIG. 17A, which is configured to use up to the 16-QAM MCS table, may not be capable of processing multi-repetition downlink traffic with a CSI reference resource size of 1, as described in more detail below.

As shown by reference number 1702, the UE 120 may receive a downlink grant from the BS 110. As shown by reference number 1704, the UE 120 may determine that the downlink grant indicates 2 repetitions of the downlink traffic. As described above, since the UE 120 is configured to use up to a 16-QAM MCS table and/or modulation scheme, the UE 120 may not be capable of decoding 16-QAM traffic with multiple repetitions when the UE 120 has a CSI reference resource size of 1.

As shown by reference number 1706, the UE 120 may determine that the UE 120 is configured with a CSI reference resource size of 1. For example, the CSI reference resource size may be configured using configuration information. RRC signaling, DCI, and/or the like. As shown by reference number 1708, the UE 120 may determine that multiple repetitions of downlink traffic are not permitted for the CSI reference resource size of 1 (e.g., based at least in part on the UE 120 being configured to use up to 16-QAM). Therefore, the UE 120 may discard the grant. As shown by reference number 1710, the UE 120 may not receive the encoded traffic associated with the grant. In this way, the UE 120 selectively discards a grant for traffic that is incompatible with a configuration of the UE 120, which conserves resources of the BS 110 that would otherwise be used to reconfigure the UE 120 or determine a configuration of the downlink traffic that is compatible with the UE 120.

In some aspects, the UE 120 may only discard a grant indicating multiple repetitions (e.g., of a downlink channel, such as a physical downlink shared channel (PDSCH)) when the CSI reference resource size corresponds to a single repetition and when the UE 120 is not configured to use 64-QAM (e.g., or a table associated with 64-QAM). For example, repetition (e.g., of the PDSCH) may be permitted for lower modulation orders (e.g., QPSK, 16-QAM, and/or the like) when the UE 120 is configured with a CSI reference resource size of 1 and when the UE 120 is configured to use up to 64-QAM. In other words, when the UE 120 is configured to use up to 64-QAM, then the UE 120 can still receive (and use) grants with multiple repetitions at QPSK or 16-QAM, even when the CSI reference resource size is 1. Thus, the CSI reference resource size of the UE 120 need not be reconfigured to switch between multiple repetitions at lower modulation schemes, and a single repetition at a higher modulation scheme.

In some aspects, the UE 120 may override a preconfigured behavior regarding multiple repetitions and a CSI reference resource size. For example, the UE 120 may receive an instruction or parameter from the BS 110 indicating to override the preconfigured behavior. When such a parameter is received, the UE 120 may use (e.g., not discard) grants for multiple repetitions at lower modulation schemes (e.g., QPSK or 16-QAM) even when the CSI reference resource size is 1. Thus, the UE 120 may receive repetitious traffic at lower modulation schemes without costly reconfiguration of the CSI reference resource size of the UE 120.

FIG. 17B shows an example of selectively discarding configuration information by the UE 120 based at least in part on incompatibility of the proposed configuration of the UE 120. As shown, assume that the UE 120 is capable of using up to 64-QAM. For example, assume that the UE 120 is capable of using an MCS table associated with up to 64-QAM.

As shown by reference number 1712, the BS 110 may provide configuration information to the UE 120. For example, the configuration information may include RRC signaling, an RRC reconfiguration message, DCI, system information, and/or the like. As shown by reference number 1714, the UE 120 may receive the configuration information. As further shown, the configuration information may indicate that the UE 120 is to use up to 64-QAM (e.g., to refer to a table associated with 64-QAM to demodulate downlink traffic), and may indicate that the UE 120 is to use a CSI reference resource size of 2 (e.g., a CSI reference resource size associated with multiple repetitions).

As shown by reference number 1716, the UE 120 may determine that the CSI reference resource size (e.g., 2, corresponding to multiple repetitions) is incompatible with the modulation scheme (e.g., since the UE 120 may not support repetitious downlink traffic when using 64-QAM). Therefore, and as shown by reference number 1718, the UE 120 may discard the configuration information. Thus, the UE 120 prevents faulty configuration of the UE 120 to attempt to determine CSI feedback and/or receive traffic based at least in part on an incompatible CSI reference resource size and modulation scheme.

As indicated above, FIGS. 17A and 17B are provided as examples. Other examples are possible and may differ from what was described with respect to FIGS. 17A and 17B.

Figure 18A:
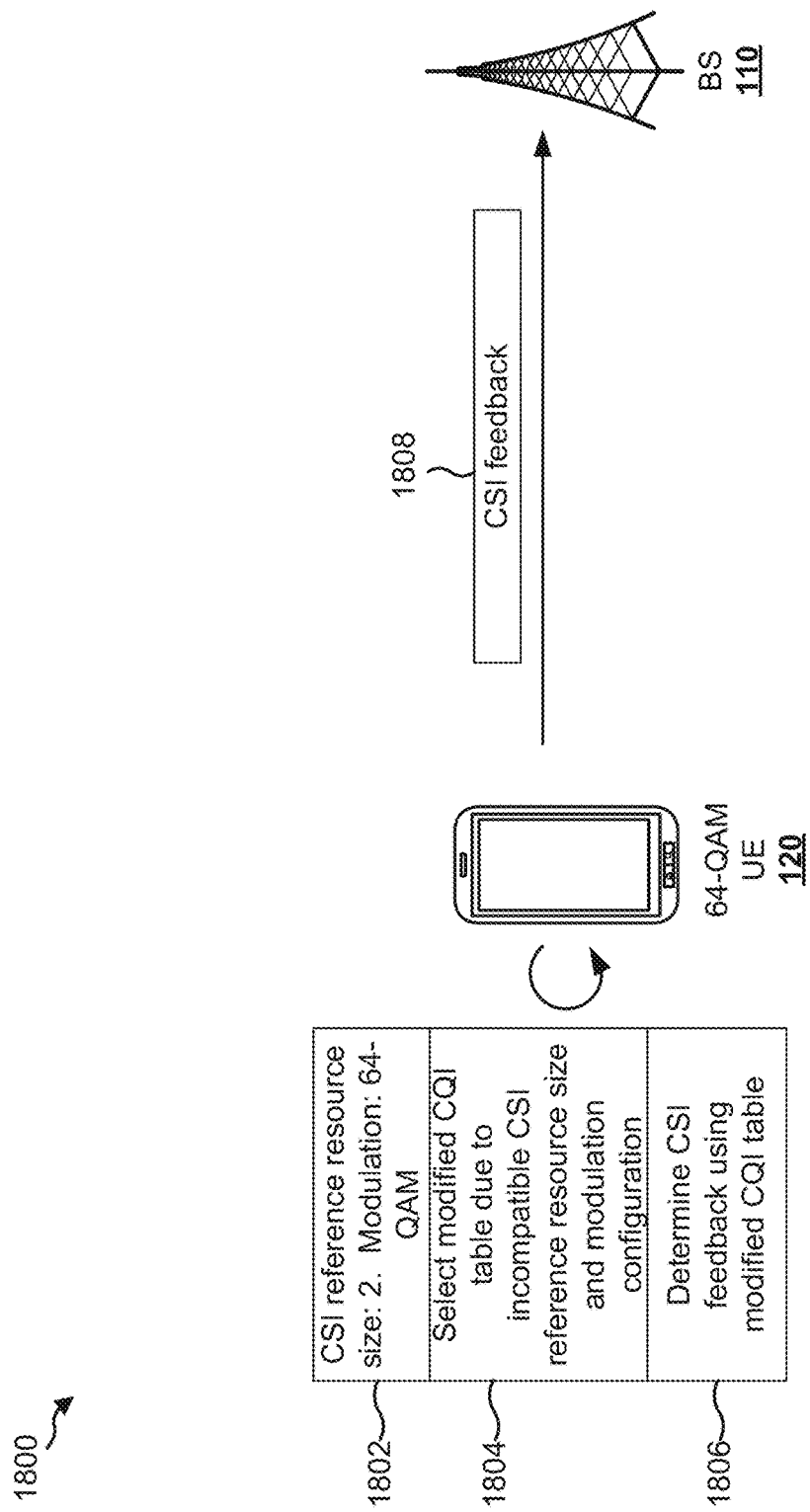

FIGS. 18A-18C are diagrams illustrating examples 1800 of selectively using a modified table to determine CSI feedback.

CSI may include, for example, CQI, a pre-coding matrix indicator, a rank indicator, and/or the like. CSI may be used by the BS 110 to select a modulation order, multiple-input multiple-output (MIMO) configuration, a puncturing configuration, a resource allocation, and/or the like, for a UE 120 that reports CSI feedback. CS feedback may be determined, at least in part, on a CQI table. For example, the UE 120 may identify a CQI index so that a single transport block with a combination of modulation scheme and transport block size corresponding to the CQI index, and occupying a group of downlink physical resource blocks of the size of the CQI reference resource, may be received with a predicted BLER not exceeding 0.1. Examples of the CQI tables referred to herein are shown in FIGS. 18B and 18C. Another example of a CQI table (e.g., for an LTE UE 120) is defined in Table 7.2.3-1 of 3GPP TS 36.213 Release 9, however, this CQI table does not take into account differing CSI reference resource sizes. Techniques and apparatuses described herein provide graceful handling of variable CSI reference resource sizes for the determination of CSI feedback using a modified version of a CQI table, such as Table 7.2.3-1.

As shown in FIG. 18A, and by reference number 1802, a UE 120 may be configured with a CSI reference resource size of 2 (e.g., for repetitious traffic) and a modulation scheme of up to 64-QAM on the downlink. As described elsewhere herein, techniques and apparatuses described herein may not be compatible with a CSI reference resource size for multiple repetitions of traffic and a modulation scheme of up to 64-QAM. Therefore, CSI feedback determined using a default CQI table (e.g., Table 7.2.3-1 or a similar table) may be inaccurate, unusable, or indeterminate.

As shown by reference number 1804, the UE 120 may determine that the CSI reference resource size and the modulation configuration are incompatible. Therefore, the UE 120 may determine to use a modified CQI table. Examples of the modified CQI table are shown and described in more detail in connection with FIGS. 18B and 18C, below.

As shown by reference number 1806, the UE 120 may determine CSI feedback using the modified table. Thus, the UE 120 may determine CSI feedback using a table configured for the co-occurrence of a CSI reference resource size for multiple repetitions, and a modulation order of 64-QAM, which eliminates the need to perform costly RRC reconfiguration of the CSI reference resource size of the UE 120 to report CSI feedback. As shown by reference number 1808, the UE 120 may report the CSI feedback determined using the modified CQI table.

FIG. 18B shows a CQI table 1810 for a CSI reference resource size of 1, and a modified CQI table 1812 for a CSI reference resource size greater than 1. As shown, when the CSI reference resource size is 1, the UE 120 may use CQI table 1810. In some aspects, CQI table 1810 may be similar to Table 7.2.3-1 described above (e.g., since Table 7.2.3-1 implicitly corresponds to a CSI reference resource size of 1). In some aspects, when the UE 120 is configured to use an MCS table associated with up to 64-QAM and a CSI reference resource size greater than 1, the UE 120 may use the CQI table with at least one value omitted. For example, the UE 120 may omit the values of CQI table 1810 associated with 64-QAM (e.g., since 64-QAM is incompatible with the CSI reference resource size greater than 1) and may select a CQI index from the set of CQI indexes 1 through 10. In some aspects, the UE 120 may determine and report a CQI index using a CS reference resource size greater than 1 repetition, irrespective of the modulation scheme, even though the downlink traffic cannot be transmitted with repetitions for some modulation schemes (e.g., 64-QAM).

In some aspects, the UE 120 may use modified CQI table 1812 to determine the CQI index. One or more values of modified CQI table 1812 are modified so that an assumed CSI reference resource size, used to determine the CQI index, may differ from a configured CSI reference resource size of the UE 120. For example, in modified CQI table 1812, the configured CSI reference resource size is used for CQI indexes 0 through 10 (associated with QPSK and 16-QAM), and an assumed CSI reference resource size of 1 is used for CQI indexes associated with 64-QAM (e.g., CQI indexes 11 through 15). Thus, by using modified CQI table 1812, a CQI index is determined assuming a CSI reference resource size compatible with the corresponding modulation scheme, which eliminates a need for costly reconfiguration of the UE 120 to use the compatible CSI reference resource size.

FIG. 18C shows an example of a modified CQI table 1814 wherein an assumed CS reference resource size and modulation scheme are modified for at least one CQI index. As shown in FIG. 18C, and by reference number 1816, modulation schemes and/or assumed CQI reference resource sizes are modified for CQI indexes 11 through 15. For example, for CQI indexes 11, 12, and 13, a modulation scheme of 16-QAM and an assumed CQI reference resource size of Csi-NumRepetitionCE/2 are used. In practice, this may mean that, for higher CQI indexes typically associated with 64-QAM, a 16-QAM configuration and a CQI reference resource size of 1 (e.g., 2 divided by 2) are used. As further shown, for CQI indexes 14 and 15, a modulation scheme of 64-QAM and an assumed CSI reference resource size of 1 are used. Thus, the UE 120 need not be reconfigured for a lower CSI reference resource size to provide usable CSI feedback.

As indicated above, FIGS. 18A-18C are provided as examples. Other examples are possible and may differ from what was described with respect to FIGS. 18A-18C.

Figure 19:
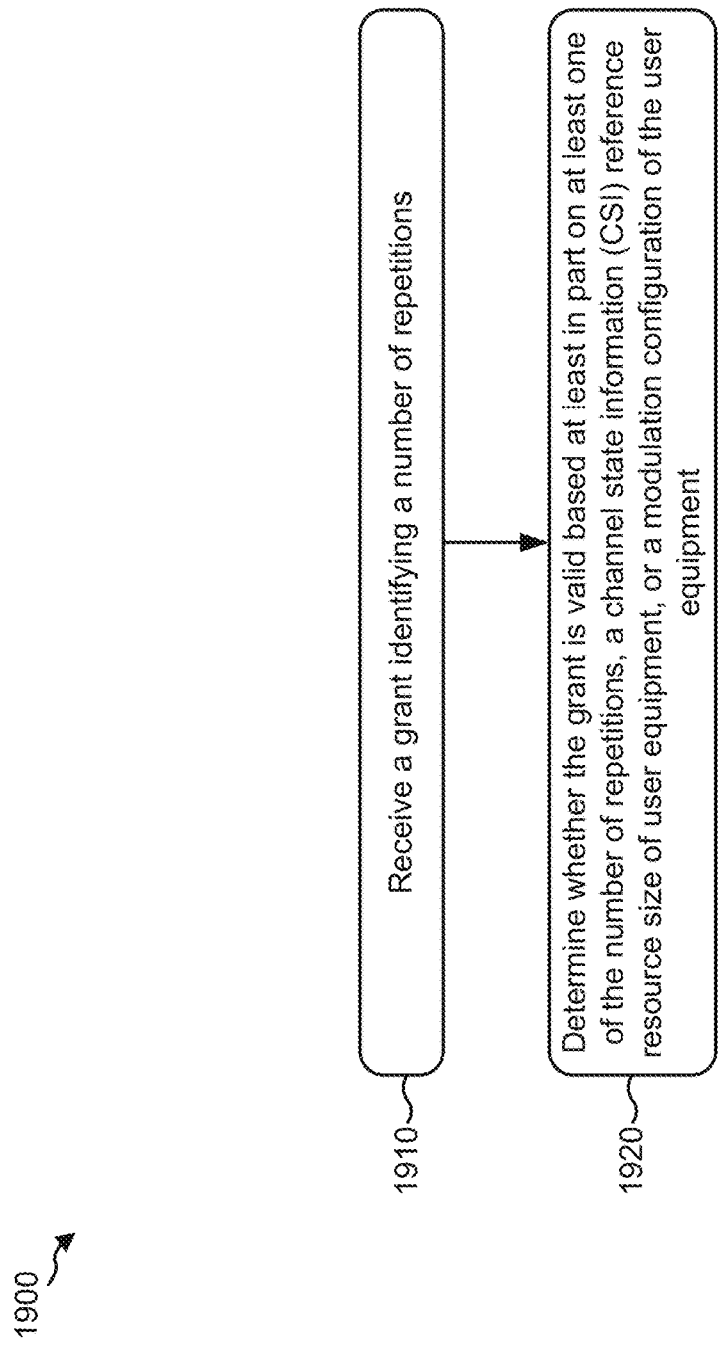
FIG. 19 is a flow chart of a method of wireless communication.

FIG. 19 is a flow chart of a process 1900 of wireless communication. Process 1900 may be performed, for example, by a UE (e.g., the UE 120). Process 1900 is a method in which a UE 120 selectively discards a grant for downlink traffic based at least in part on a CSI reference resource size.

As shown in FIG. 19, process 1900 may include receiving a grant identifying a number of repetitions (block 1910). For example, the UE may receive a grant identifying a number of repetitions. In some aspects, the grant may include an R value, as described in more detail elsewhere herein. In some aspects, the grant may indicate a modulation scheme that is to be used to decode downlink traffic associated with the grant.

As shown in FIG. 19, process 1900 may include determining whether the grant is valid based at least in part on at least one of the number of repetitions, a channel state information (CSI) reference resource size of user equipment, or a modulation configuration of the user equipment (block 1920). For example, the UE may determine whether the grant is valid. In some aspects, the UE may selectively discard or use the grant based at least in part on whether the grant is valid. The UE may determine whether the grant is valid based at least in part on at least one of the number of repetitions identified by the grant, a CSI reference resource size of the UE (e.g., configured using RRC signaling), or a modulation configuration of the UE (e.g., a maximum MCS table that the UE is configured to use).

In some aspects, the modulation configuration indicates that the UE is not configured to use a table associated with a particular modulation scheme and wherein the grant is determined to be invalid when the CSI reference resource size corresponds to a single repetition and the number of repetitions is greater than one repetition. In some aspects, the particular modulation scheme is 64-QAM.

In some aspects, the modulation configuration indicates that the user equipment is configured to use a table associated with a 64-quadrature amplitude modulation (64-QAM) modulation scheme, and the grant is determined to be valid when the CSI reference resource size corresponds to a single repetition and the number of repetitions is greater than one repetition.

In some aspects, the determination of whether the grant is valid is based at least in part on a received parameter indicating that multiple repetitions are permitted when the CSI reference resource size corresponds to a single repetition.

In some aspects, the UE may receive configuration information indicating the CSI reference resource size and the modulation configuration, and may selectively discard the configuration information based at least in part on the CSI reference resource size and the modulation configuration.

In some aspects, the CSI reference resource size corresponds to more than one repetition of downlink traffic and the modulation configuration identifies a modulation scheme of 64-QAM.

In some aspects, the user equipment is configured to discard the configuration information when the CSI reference resource size corresponds to more than one repetition of downlink traffic and the modulation configuration identifies a modulation scheme of 64-QAM.

In some aspects, the UE is configured to not discard the configuration information when the CSI reference resource size corresponds to one repetition of downlink traffic or the modulation configuration identifies a modulation scheme other than 64-QAM.

Although FIG. 19 shows example blocks of a method of wireless communication, in some aspects, the method may include additional blocks, fewer blocks, different blocks, or differently arranged blocks than those shown in FIG. 19. Additionally, or alternatively, two or more blocks shown in FIG. 19 may be performed in parallel.

FIG. 20 is a flow chart of an example process 2000 of wireless communication. Process 2000 may be performed, for example, by a UE (e.g., the UE 120). Process 2000 is a process in which a UE 120 selectively uses a modified table to determine CSI feedback.

As shown in FIG. 20, process 2000 may include determining channel state information (CSI) feedback based at least in part on a channel quality information (CQI) table and a configured CSI reference resource size of user equipment, wherein at least one of the CSI feedback or the CQI table is modified based at least in part on a modulation configuration of the user equipment (block 2010). For example, the UE may determine CSI feedback (e.g., based at least in part on a signal to noise ratio (SNR), channel conditions, an RSSI value, an RSRP value, an RSRQ vale, and/or the like). The CSI feedback may be based at least in part on a CQI table, as described in more detail in connection with FIGS. 18A-18C, and may be based at least in part on a configured CSI reference resource size of the UE (e.g., which may be configured using RRC signaling or an RRC reconfiguration). At least one of the CS feedback or the CQI table may be modified, as described in more detail elsewhere herein.

As shown in FIG. 20, process 2000 may include reporting the CSI feedback (block 2020). For example, the UE may report the CSI feedback, as described in more detail elsewhere herein. In some aspects, the UE is configured to use 64-quadrature amplitude modulation (64-QAM) according to the modulation configuration and the UE is configured to use a configured CS reference resource size corresponding to multiple repetitions of downlink traffic.

In some aspects, the CQI table is modified to remove CQI values for 64-QAM based at least in part on the UE being configured to use the CSI reference resource size corresponding to multiple repetitions of downlink traffic.

In some aspects, the CQI table is modified to indicate a CSI reference resource size corresponding to a number of repetitions given by the configured CS reference resource size for CQI values associated with quadrature phase shift keying (QPSK) and 16-QAM modulation orders, and the CQI table is modified to indicate a CSI reference resource size corresponding to one repetition for CQI values associated with a 64-QAM modulation order.

In some aspects, the UE, when using 64-QAM, is not configured for multiple repetitions of downlink traffic, and the CSI feedback is determined based at least in part on the CSI reference resource size corresponding to multiple repetitions of downlink traffic.

In some aspects, at least one first value of the CQI table is modified based at least in part on the configured CSI reference resource size to be associated with at least one of a different modulation scheme, a different code rate, or a different assumed CSI reference resource size.

In some aspects, the at least one first value of the CQI table is modified based at least in part on whether the configured CSI reference resource size is greater than one. In some aspects, multiple entries of the CQI table have respective different CSI reference resource sizes.

Although FIG. 20 shows example blocks of a method of wireless communication, in some aspects, the method may include additional blocks, fewer blocks, different blocks, or differently arranged blocks than those shown in FIG. 20. Additionally, or alternatively, two or more blocks shown in FIG. 20 may be performed in parallel.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B. C, or any combination thereof" include any combination of A. B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C. or A and B and C, where any such combinations may contain one or more member or members of A. B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving, by a user equipment (UE), a grant for downlink traffic, wherein the UE is capable of using a first modulation order corresponding to a first modulation and coding scheme (MCS) table and a second modulation order corresponding to a second MCS table; and
decoding, by the UE, the downlink traffic according to the first MCS table or the second MCS table based at least in part on whether the grant is received in a UE-specific search space or a common search space and based on whether the grant indicates at least two repetitions of the downlink traffic, wherein the second MCS table is associated with a fifth bit in the grant.

2. The method of claim 1, wherein the grant is received in the UE-specific search space; and
wherein the UE is configured to decode the downlink traffic according to the first MCS table and based at least in part on a transport block size associated with the first MCS table.

3. The method of claim 1, wherein the grant is received in the common search space; and
wherein the UE is configured to decode the downlink traffic according to the second MCS table and based at least in part on a transport block size associated with the second MCS table.

4. The method of claim 1, wherein the grant is received in an overlap between the common search space and the UE-specific search space; and
wherein the UE is configured to determine whether to decode the downlink traffic according to the first MCS table or the second MCS table based at least in part on whether an MCS field of the grant includes a particular bit,
wherein the particular bit indicates whether the grant is associated with the common search space or the UE-specific search space.

5. The method of claim 1, wherein the grant is received in an overlap between the common search space and the UE-specific search space; and
wherein the UE is configured to determine whether to decode the downlink traffic according to the first MCS table or the second MCS table based at least in part on a preconfigured MCS table of the first MCS table or the second MCS table.

6. A user equipment (UE) for wireless communication, comprising:
a memory; and
at least one processor, coupled to the memory, configured to cause the UE to:
receive a grant for downlink traffic, wherein the UE is capable of using a first modulation order corresponding to a first modulation and coding scheme (MCS) table and a second modulation order corresponding to a second MCS table; and
decode the downlink traffic according to the first MCS table or the second MCS table based at least in part on whether the grant is received in a UE-specific search space or a common search space and based on whether the grant indicates at least two repetitions of the downlink traffic, wherein the second MCS table is associated with a fifth bit in the grant.

7. The UE of claim 6, wherein the grant is received in the UE-specific search space; and
wherein the UE is configured to decode the downlink traffic according to the first MCS table and based at least in part on a transport block size associated with the first MCS table.

8. The UE of claim 6, wherein the grant is received in the common search space; and
wherein the UE is configured to decode the downlink traffic according to the second MCS table and based at least in part on a transport block size associated with the second MCS table.

9. The UE of claim 6, wherein the grant is received in an overlap between the common search space and the UE-specific search space; and
wherein the UE is configured to determine whether to decode the downlink traffic according to the first MCS table or the second MCS table based at least in part on whether an MCS field of the grant includes a particular bit,
wherein the particular bit indicates whether the grant is associated with the common search space or the UE-specific search space.

10. The UE of claim 6, wherein the grant is received in an overlap between the common search space and the UE-specific search space; and
wherein the UE is configured to determine whether to decode the downlink traffic according to the first MCS table or the second MCS table based at least in part on a preconfigured MCS table of the first MCS table or the second MCS table.

11. A non-transitory computer-readable medium storing one or more instructions for wireless communication, the one or more instructions comprising:
one or more instructions that, when executed by one or more processors of a user equipment (UE), cause the UE to:
receive a grant for downlink traffic, wherein the UE is capable of using a first modulation order corresponding to a first modulation and coding scheme (MCS) table and a second modulation order corresponding to a second MCS table; and
decode the downlink traffic according to the first MCS table or the second MCS table based at least in part on whether the grant is received in a UE-specific search space or a common search space and based on whether the grant indicates at least two repetitions of the downlink traffic, wherein the second MCS table is associated with a fifth bit in the grant.

12. The non-transitory computer-readable medium of claim 11, wherein the grant is received in the UE-specific search space; and
wherein the one or more instructions cause the UE to decode the downlink traffic according to the first MCS table and based at least in part on a transport block size associated with the first MCS table.

13. The non-transitory computer-readable medium of claim 11, wherein the grant is received in the common search space; and
wherein the one or more instructions cause the UE to decode the downlink traffic according to the second MCS table and based at least in part on a transport block size associated with the second MCS table.

14. The non-transitory computer-readable medium of claim 11, wherein the grant is received in an overlap between the common search space and the UE-specific search space; and
wherein the one or more instructions cause the UE to determine whether to decode the downlink traffic according to the first MCS table or the second MCS table based at least in part on whether an MCS field of the grant includes a particular bit,
wherein the particular bit indicates whether the grant is associated with the common search space or the UE-specific search space.

15. The non-transitory computer-readable medium of claim 11, wherein the grant is received in an overlap between the common search space and the UE-specific search space; and
wherein the one or more instructions cause the UE to determine whether to decode the downlink traffic according to the first MCS table or the second MCS table based at least in part on a preconfigured MCS table of the first MCS table or the second MCS table.

16. An apparatus for wireless communication, comprising:
means for receiving a grant for downlink traffic, wherein the apparatus is capable of using a first modulation order corresponding to a first modulation and coding scheme (MCS) table and a second modulation order corresponding to a second MCS table; and
means for decoding the downlink traffic according to the first MCS table or the second MCS table based at least in part on whether the grant is received in a user equipment (UE)-specific search space or a common search space and based on whether the grant indicates at least two repetitions of the downlink traffic, wherein the second MCS table is associated with a fifth bit in the grant.

17. The apparatus of claim 16, wherein the grant is received in the UE-specific search space; and wherein the apparatus is configured to decode the downlink traffic according to the first MCS table and based at least in part on a transport block size associated with the first MCS table.

18. The apparatus of claim 16, wherein the grant is received in the common search space; and
wherein the apparatus is configured to decode the downlink traffic according to the second MCS table and based at least in part on a transport block size associated with the second MCS table.

19. The apparatus of claim 16, wherein the grant is received in an overlap between the common search space and the UE-specific search space; and
wherein the apparatus is configured to determine whether to decode the downlink traffic according to the first MCS table or the second MCS table based at least in part on whether an MCS field of the grant includes a particular bit,
wherein the particular bit indicates whether the grant is associated with the common search space or the UE-specific search space.

20. The apparatus of claim 16, wherein the grant is received in an overlap between the common search space and the UE-specific search space; and
wherein the apparatus is configured to determine whether to decode the downlink traffic according to the first MCS table or the second MCS table based at least in part on a preconfigured MCS table of the first MCS table or the second MCS table.

\* \* \* \* \*